United States Patent
Ogawa et al.

(10) Patent No.: US 7,133,094 B2
(45) Date of Patent: Nov. 7, 2006

(54) LIQUID CRYSTAL DISPLAY APPARATUS HAVING A TRANSPARENT LAYER COVERING A REFLECTIVE LAYER

(75) Inventors: Shinji Ogawa, Ohgaki (JP); Kazuhiro Inoue, Gifu (JP); Norio Koma, Gifu (JP); Nobuhiko Oda, Hashima (JP); Satoshi Ishida, Ohgaki (JP); Tsutomu Yamada, Gifu (JP); Tohru Yamashita, Gifu (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 10/376,721

(22) Filed: Feb. 28, 2003

(65) Prior Publication Data

US 2004/0004686 A1  Jan. 8, 2004

(30) Foreign Application Priority Data

Mar. 4, 2002  (JP) ............................. 2002-057306
Mar. 5, 2002  (JP) ............................. 2002-059336

(51) Int. Cl.
    G02F 1/1343  (2006.01)
(52) U.S. Cl. ........................ 349/114; 349/38; 349/113; 349/138
(58) Field of Classification Search ................ 349/113, 349/143, 147, 114
    See application file for complete search history.

(56) References Cited

U.S. PATENT DOCUMENTS

| | | | |
|---|---|---|---|
| 5,633,738 A | | 5/1997 | Wakui et al. |
| 5,689,320 A | | 11/1997 | Okada et al. |
| 5,764,324 A | * | 6/1998 | Lu et al. ...................... 349/113 |
| 5,771,083 A | * | 6/1998 | Fujihara et al. ............. 349/147 |
| 5,892,563 A | | 4/1999 | Ono et al. |
| 5,926,240 A | | 7/1999 | Hirota et al. |
| 5,949,507 A | * | 9/1999 | Shimada et al. ............. 349/113 |
| 5,956,105 A | | 9/1999 | Yamazaki et al. |
| 6,104,450 A | * | 8/2000 | Hiraishi ........................ 349/48 |
| 6,168,980 B1 | | 1/2001 | Yamazaki et al. |
| 6,222,315 B1 | * | 4/2001 | Yoshizawa et al. ......... 313/509 |
| 6,236,440 B1 | * | 5/2001 | Johnson et al. ............. 349/122 |

(Continued)

FOREIGN PATENT DOCUMENTS

EP  1 122 585 A1  8/2001

(Continued)

OTHER PUBLICATIONS

Office Action from U.S. Appl. No. 10/330,924, dated Jan. 15, 2004.

(Continued)

*Primary Examiner*—Andrew Schechter
(74) *Attorney, Agent, or Firm*—Cantor Colburn LLP

(57) ABSTRACT

A reflective layer for reflecting light incident from a second substrate side and transmitting through a second electrode made of ITO or the like is formed above a first substrate, a switching element provided for each pixel, and an insulating film covering the switching element, the reflective layer being insulated from the switching element. A first electrode having a work function similar to the second electrode and made of a transparent conductive material such as ITO is formed more proximate to a liquid crystal layer than is the reflective layer and is connected to the switching element. The thickness of the first electrode is set to 100 Å or less or in a range approximately from 750 Å to 1250 Å. Alternatively, the switching element maybe connected to the reflective electrode, the first electrode and the reflective electrode which are formed with an insulating film therebetween may be capacitively coupled, and the first electrode may be driven by the reflective electrode via the capacitor.

24 Claims, 11 Drawing Sheets

U.S. PATENT DOCUMENTS

| | | | |
|---|---|---|---|
| 6,249,330 B1 | 6/2001 | Yamaji et al. | |
| 6,466,280 B1 | 10/2002 | Park et al. | |
| 6,509,942 B1 | 1/2003 | Tanaka et al. | |
| 6,563,554 B1 | 5/2003 | Okamoto et al. | |
| 6,567,141 B1 | 5/2003 | Kaneko et al. | |
| 6,583,840 B1 | 6/2003 | Inoue et al. | |
| 6,680,765 B1 * | 1/2004 | Maeda et al. | 349/117 |
| 6,693,698 B1 * | 2/2004 | Marshall et al. | 349/148 |
| 6,697,138 B1 | 2/2004 | Ha et al. | |
| 6,720,944 B1 | 4/2004 | Ishii et al. | |
| 6,809,785 B1 * | 10/2004 | Fujino | 349/114 |
| 2001/0020991 A1 | 9/2001 | Kubo et al. | 349/113 |
| 2001/0052948 A1 | 12/2001 | Okamoto et al. | 349/12 |
| 2002/0130991 A1 | 9/2002 | Kamijo | |
| 2005/0001961 A1 | 1/2005 | Koma et al. | |
| 2005/0062042 A1 * | 3/2005 | Hayashi et al. | 257/59 |

FOREIGN PATENT DOCUMENTS

| | | |
|---|---|---|
| JP | 7333598 | 12/1995 |
| JP | 8-184824 | 7/1996 |
| JP | 11101992 | 4/1999 |
| JP | 2001043980 | 2/2001 |
| JP | 2001-085163 | 3/2001 |
| JP | 2002-365664 | 12/2002 |
| WO | WO 00/05601 | 2/2000 |
| WO | WO 00/05621 | 3/2000 |

OTHER PUBLICATIONS

European Search Report, European Application No. 02259010.3-2205, Date of Mailing, Sep. 16, 2003.

Patent Abstracts of Japan, Publication No. 2001312253, dated Nov. 9, 2001 (1 page).

International Search Report for EP 02 25 9009 dated Jun. 5, 2003.

English Translation of Japanese Patent-Laid Open Publication No. Hei 7-333598 dated Dec. 22, 1995.

English Translation of Japanese Patent Laid-Open Publication No. Hei 11-101992 dated Apr. 13, 1999.

USPTO Office Action for U.S. Appl. No. 10/330,924 dated Feb. 8, 2005.

USPTO Office Action for U.S. Appl. No. 10/330,905 dated Dec. 2, 2004.

USPTO Office Action for U.S. Appl. No. 10/330,998 dated Dec. 2, 2004.

"Natural Oxide Film and Chemically Formed Film", Sakae Tajima, Nov. 10, 1955, published in Surface Treatment Handbook, and English excerpt.

Office Action for corresponding Korean patent application No. 10-2002-0084948 with English excerpt translation.

Japanese Laid-Open Publication No. Hei 10-333168 with English abstract.

excerpt English translation of Japanese Patent Laid-Open Publication No. Hei 10-333168 cited in related Korean patent application No. 10-2002-0004940.

Office Action dated Mar. 24, 2006 for related U.S. Appl. No. 10/330,998.

Office Action dated Feb. 28, 2006 for related U.S. Appl. No. 10/330,905.

Office Action dated Dec. 14, 2005 for related U.S. Appl. No. 10/330,924.

Final Office Action dated Jul. 28, 2006, for related patent application Serial No. 10/330,924 (Our ref. No. YKI-0116).

* cited by examiner

LIQUID CRYSTAL DISPLAY APPARATUS HAVING A TRANSPARENT LAYER COVERING A REFLECTIVE LAYER

BACKGROUND OF THE INVENTION

1. Field of the Invention

The present invention relates to a structure in a reflective liquid crystal display apparatus or a transflective liquid crystal display apparatus which has reflective functionality.

2. Description of the Related Art

Liquid crystal display apparatuses (hereinafter referred to as "LCDs") are advantageous in that they are thin and consume relatively little power, and are now widely used for computer monitors and monitors for portable information devices or the like. In LCDs, liquid crystal is sealed between a pair of substrates each having an electrode formed thereon, and the alignment of the liquid crystal disposed between these electrodes is controlled by these electrodes to thereby create a display. However, unlike CRT (Cathode Ray Tube) displays, electroluminescence (hereinafter referred to as "EL") displays, or the like, LCDs require a light source in order to display an image for viewer observation, because LCDs are not, in principle, self-emissive.

Transmissive LCDs, in which a transparent electrode is used as an electrode formed on each substrate and a light source is disposed on the rear or side of the LC panel, can provide a bright display even in a dark environment, by controlling the transmission amount of light from the light source through the LC panel. Transmissive LCDs, however, have disadvantages in that power consumption is relatively high due to the light source which must continually illuminate, and that sufficient contrast cannot be ensured when the display is used in a bright environment, such as outdoors under daylight.

In reflective LCDs, on the other hand, external light such as sunlight and room light is used as a light source, and such an ambient light entering the LCD panel is reflected by a reflective electrode formed on the substrate provided on the non-viewing surface side. Thus, light enters through the liquid crystal layer, is reflected by the reflective electrode, and then exits from the LCD panel. By controlling the amount of light radiating from the LCD panel for each pixel, reflective LCDs display an image. While reflective LCDs, which use external light as a light source, differ from transmissive LCDs in that their display cannot be seen when no such external light is available, they have advantages that power consumption is very low because the power required for the light source can be eliminated and that sufficient contrast can be obtained in the bright environment such as outdoors. However, reflective LCDs suffer problems in that typical display quality such as reproducibility of color and display brightness is inferior to that of the transmissive LCDs.

On the other hand, because the reflective LCDs having lower power consumption than the transmissive LCDs are more advantageous in response to recent increased demand for lower power consumption devices, attempts have been made to use the reflective LCDs in high resolution monitors or the like of portable devices, and increasing effort has been put in to research and development related to improving the display quality of reflective LCDs.

FIG. 1 is a plan view showing one pixel portion (on a first substrate side) of a conventional active matrix reflective LCD in which a thin film transistor (TFT) is provided for each pixel. FIG. 2 schematically shows a cross sectional configuration of the reflective LCD taken along line C—C of FIG. 1.

The reflective LCD comprises a first substrate 100 and a second substrate 200 which are adhered to each other with a predetermined gap therebetween, and a liquid crystal layer 300 sealed between the first and second substrates. A glass or plastic substrate is used for the first and second substrates 100 and 200, while a transparent substrate is used as the second substrate 200 located on the viewer side, at least in this example.

On a side of the first substrate facing the liquid crystal, a thin film transistor (TFT) 110 is formed for each pixel. In this TFT 110, for example, a drain region in an active layer 120 is connected with a data line 136 which supplies a data signal to each pixel via a contact hole formed in an interlayer insulating film 134. A source region of the TFT 110 is connected with a first electrode (pixel electrode) 150 which is individually formed for each pixel via a contact hole formed to penetrate the interlayer insulating film 134 and a planarization insulating film 138.

A reflective material, such as Al, Ag, or the like, is employed as the first electrode 150. On the reflective electrode 150, an alignment film 160 is formed for controlling the initial alignment of the liquid crystal layer 300.

When the LCD is a color LCD, on a side facing the liquid crystal layer of the second substrate 200, which is disposed so as to oppose to the first substrate 100, a color filter (R, G, B) 210 is formed corresponding to each pixel electrode 150, and a transparent electrode 250 comprising a transparent conductive material such as ITO (Indium Tin Oxide) is formed on the color filter 210 as a second electrode. Further, on the transparent electrode 250, an alignment film 260 which is similar to the alignment film 160 on the first substrate side is formed.

In the reflective LCD configured as described above, the amount of light which enters the liquid crystal panel, is reflected by the reflective electrode 150, and radiates from the liquid crystal panel, is controlled for each pixel, to thereby produce a desired display.

In LCDs, not limited to the reflective LCDs, the liquid crystal is driven by an alternative voltage so as to prevent image persistence. With regard to transmissive LCDs, because both the first electrode on the first substrate and the second electrode on the second substrate should be transparent, ITO is used as a material for both electrodes. Consequently, for AC driving of the liquid crystal, each of the first and second electrodes can apply a positive or negative voltage under substantially the same conditions.

However, in the reflective LCD as shown in FIG. 2, in which a reflective electrode formed by a metal material is used as the first electrode 150 and a transparent electrode formed by a transparent metal oxide material such as ITO is used as the second electrode 250, certain problems such as display flicker and image persistence in the liquid crystal layer may occur depending on the drive conditions. These problems are noticeable when the liquid crystal is driven at a frequency less than the critical flicker frequency (CFF), for example, as has been reported recently. In order to further reduce power consumption of LCDs, attempts have been made to reduce the frequency for driving the liquid crystal (≈ the frequency for writing data to liquid crystal (liquid crystal capacitor) at each pixel formed in the region where the first and second electrodes face each other) equal to or less than the CFF at which image flicker can be recognized by the human eye, approximately 40 Hz–30 Hz, by reducing such a drive frequency to less than 60 Hz, which is a reference frequency in the NTSC standards, for example. It has been revealed, however, that when each pixel of a conventional reflective liquid crystal panel is driven at a frequency less than the CFF, the above-described problems of flicker and image persistence in the liquid crystal layer are significant, which leads to significant deterioration in display quality.

The applicant's research into the causes of such flicker and image persistence in the liquid crystal layer generated in a reflective LCD as shown in FIGS. 1 and 2 revealed that asymmetry of the electrical characteristics of the first and second electrodes relative to the liquid crystal layer 300 is one cause. It is believed that such asymmetry results from a significant difference between a work function of 4.7 eV–5.2 eV for the transparent metal oxide such as ITO used in the second electrode 250 and a work function of 4.2 eV–4.3 eV for the metal such as Al used in the first electrode 150. Any such difference in the work function would cause there to be a difference of charge actually induced on the liquid crystal interface via the alignment films 160 and 260, when a same voltage is applied to each electrode. Such a difference of charge induced on the interface between the liquid crystal and the alignment film at each electrode side would in turn cause impurity ions or the like to be unevenly located toward one of the first and second electrodes within the liquid crystal layer, which results in accumulation of remaining DC voltage in the liquid crystal layer 300. As the liquid crystal drive frequency is lowered, the influence of this remaining DC voltage on the liquid crystal increases and generation of flicker and image persistence in the liquid crystal layer become more significant. Accordingly, driving the liquid crystal at a frequency less than the CFF, in particular, is substantially difficult.

Reflective LCDs in which ITO is used for both the first and second electrodes as in transmissive LCDs and a reflector is separately provided on the outer side of the first electrode (on the side of the first electrode not facing the liquid crystal) are conventionally known. When a reflector is thus provided on the outer side of the first substrate, however, the length of a light path is increased by an amount corresponding to the thickness of the transparent first electrode 150 and of the transparent first substrate, thereby making the display quality likely to deteriorate due to parallax. Consequently, in reflective LCDs which demand high display quality, a reflective electrode is employed as a pixel electrode, and it is therefore impossible to reduce the drive frequency so as to achieve lower power consumption, because flicker or the like is generated at the lower drive frequency, as described above.

SUMMARY OF THE INVENTION

The present invention was conceived to solve the above problem and advantageously provides a liquid crystal display apparatus in which the electrical characteristics of the first electrode and the second electrode with respect to the liquid crystal layer are matched so as to eliminate influence of flicker and parallax and to realize less coloring, high display quality, and low power consumption.

According to one aspect of the present invention, there is provided a liquid crystal display apparatus comprising a first substrate having a first electrode, a second substrate having a second electrode, and a liquid crystal layer sealed between the first and second substrates, wherein a reflective layer for reflecting light incident from the second substrate side to the liquid crystal layer is provided above the first substrate, and the first electrode is a transparent electrode made of a transparent conductive material and formed to cover the reflective layer, the thickness of the transparent electrode being in a range from 750 Å to 1250 Å.

According to another aspect of the present invention, there is provided a liquid crystal display apparatus comprising a first substrate having a first electrode, a second substrate having a second electrode, and a liquid crystal layer sealed between the first and second substrates, wherein a reflective layer for reflecting light incident from the second substrate side to the liquid crystal layer is provided above the first substrate, and the first electrode is a transparent electrode made of a transparent conductive material and formed to cover the reflective layer, the thickness of the transparent electrode being in a range from 1 Å to 100 Å. According to another aspect of the present invention, it is preferable that, in the liquid crystal display apparatus, the thickness of the transparent electrode is 10 Å or greater.

According to another aspect of the present invention, there is provided a liquid crystal display apparatus comprising a first substrate having a first electrode, a second substrate having a second electrode, and a liquid crystal layer sealed between the first and second substrates, wherein a reflective layer for reflecting light incident from the second substrate side to the liquid crystal layer is formed as a first electrode above the first substrate, and a transparent electrode made of a transparent conductive material is formed covering the reflective layer, the thickness of the transparent electrode being in a range from 1 Å to 100 Å.

According to another aspect of the present invention, it is preferable that, in the liquid crystal display apparatus, the thickness of the transparent electrode is 10 Å or greater.

According to another aspect of the present invention, it is preferable that, in the liquid crystal display apparatus, a switching element corresponding to each pixel is provided between the reflective layer and the first substrate, and the switching element is electrically connected to the first electrode.

According to another aspect of the present invention, it is preferable that, in the liquid crystal display apparatus, a difference between a work function of the transparent conductive material of the first electrode or of the transparent electrode and a work function of a transparent conductive material of the second electrode formed on a side, facing the liquid crystal layer, of the second substrate is 0.5 eV or less.

According to another aspect of the present invention, it is preferable that, in the liquid crystal display apparatus, a switching element corresponding to each pixel is provided between the reflective layer and the first substrate; the switching element is electrically connected to the transparent electrode; an insulating film is formed between the transparent electrode and the reflective electrode; the transparent electrode is capacitively coupled to the reflective electrode via the insulating film; and a voltage supplied from the switching element to the reflective layer is applied to the transparent electrode via a capacitor formed by the reflective electrode and the transparent electrode disposed with the insulating film therebetween.

As described, by providing, on a side facing the liquid crystal layer on the first substrate side, a transparent first electrode having characteristics similar to those of the second electrode on the second substrate side and providing a reflective layer below the first electrode, it is possible to symmetrically drive the liquid crystal layer by the first and second electrodes. In particular, even when the driving frequency of the liquid crystal layer in each pixel is set to be lower than, for example, 60 Hz, it is possible to achieve a high quality display without generation of flicker or the like.

In addition, by setting the thickness of the transparent first electrode to be 100 Å or less or 750 Å to 1250 Å, it is possible to prevent coloring and reduction in reflectance caused by the first electrode placed in front of the reflective layer.

According to another aspect of the present invention, there is provided a liquid crystal display apparatus comprising a first substrate having a first electrode individually provided for each pixel, a second substrate having a second electrode and a liquid crystal layer sealed between the first and second substrates, for achieving display in each pixel, wherein the first substrate further comprises a switching element provided for each pixel, and a reflective electrode for reflecting light incident from the second substrate side to the liquid crystal layer, the reflective electrode partially covering a pixel region and formed above and electrically connected to the switching element; a transparent electrode made of a transparent conductive material is formed as the first electrode above the reflective electrode with an insulating film therebetween; the transparent electrode is capacitively coupled to the reflective electrode; and a voltage supplied from the switching element to the reflective electrode is applied to the transparent electrode via a capacitor formed of the reflective electrode and the first electrode disposed with the insulating film therebetween.

As described, by providing, on a side of the first substrate facing the liquid crystal layer, a transparent first electrode having characteristics similar to those of the second electrode on the second substrate side and providing a reflective layer below the first electrode, it is possible for the liquid crystal layer to be symmetrically driven by the first and second electrodes. Here, a configuration wherein a difference between a work function of the transparent conductive material of the first electrode and a work function of a transparent conductive material of the second electrode formed on a side, facing the liquid crystal layer, of the second substrate is set to be 0.5 eV or less is particularly effective for symmetric driving. By employing such a configuration, even when the drive frequency of the liquid crystal layer in each pixel is set to be lower than, for example, 60 Hz, a high quality display can be achieved without generation of flicker or the like. In addition, according to the present invention, a structure is employed wherein a voltage for driving liquid crystal is applied to a transparent first electrode using a capacitive coupling via a reflective electrode connected to a switching element. With this structure, even though an electrode on the first substrate side is formed as a multi-layered structure of a reflective electrode and a transparent electrode, a structure similar to a conventional reflective liquid crystal display apparatus in which a metal reflective electrode is used as a pixel electrode can be used as the connection structure between the switching element and the reflective electrode. Therefore, it is possible to improve display quality and reduce power consumption with minimum design alteration.

According to another aspect of the present invention, there is provided a liquid crystal display apparatus comprising a first substrate having a first electrode individually provided for each pixel, a second substrate having a second electrode, and a liquid crystal layer sealed between the first and second substrates, for achieving display in each pixel, wherein the first substrate further comprises a switching element provided for each pixel and a reflective electrode for reflecting light incident from the second substrate side to the liquid crystal layer, the reflective electrode formed above and electrically connected to the switching element; a transparent electrode made of a transparent conductive material is formed as the first electrode above the reflective electrode with an insulating film therebetween; the transparent electrode is capacitively coupled to the reflective electrode; a voltage supplied from the switching element to the reflective electrode is applied to the transparent electrode via a capacitor formed of the reflective electrode and the first electrode disposed with the insulating film therebetween; and a capacitance C1 of a pixel capacitor formed of the first electrode and the second electrode disposed to oppose each other with the liquid crystal layer therebetween and a capacitance C2 of the capacitor formed of the reflective electrode and the first electrode satisfy a condition, $C2 > 100 \times C1$.

According to another aspect of the present invention, there is provided a liquid crystal display apparatus comprising a first substrate having a first electrode individually provided for each pixel, a second substrate having a second electrode, and a liquid crystal layer sealed between the first and second substrates, for achieving display in each pixel, wherein the first substrate further comprises a switching element provided for each pixel and a reflective electrode for reflecting light incident from the second substrate side to the liquid crystal layer, the reflective electrode formed above and electrically connected to the switching element; a transparent electrode made of a transparent conductive material is formed as the first electrode above the reflective electrode with an insulating film therebetween; the transparent electrode is capacitively coupled to the reflective electrode; a voltage supplied from the switching element to the reflective electrode is applied to the transparent electrode via the capacitive coupling; and an area S1 of the first electrode disposed to oppose the second electrode with the liquid crystal layer therebetween and an area S2 of the overlapping portion of the reflective electrode and the first electrode disposed to oppose each other with the insulating film therebetween satisfy a relationship, $S2 > 0.1 \times S1$.

When a layer of transparent conductive material is formed on a reflective electrode made of a metal material, a natural oxide film is formed on the surface of the reflective electrode, and the reflective electrode and a first electrode made of the transparent conductive material are insulated. However, by designing a structure such that the capacitances and areas satisfy the above described relationship, it is possible to obtain a structure in which a reflective electrode connected to a switching element can apply a voltage sufficient for driving the liquid crystal to the transparent first electrode via capacitive coupling.

According to another aspect of the present invention, it is preferable that, in the liquid crystal display device, the thickness of the transparent electrode to be capacitively coupled to the reflective electrode is in a range of 750 Å to 1250 Å or in a range from 1 Å to 100 Å. With such a thickness, it is possible to obtain high quality display without coloring.

According to another aspect of the present invention, there is provided a light emitting display apparatus comprising an emissive element formed on a primary surface side of a substrate and having a structure of a first electrode, an emissive element layer, and a second electrode formed in that order from the substrate, wherein a reflective layer for reflecting light incident from the emissive element layer or from the second electrode side is provided between the first electrode made of a transparent conductive material and the substrate; and the thickness of the transparent first electrode is in a range from 750 Å to 1250 Å.

According to another aspect of the present invention, there is provided a light emitting display apparatus comprising an emissive element formed on a primary surface side of a substrate and having a structure of a first electrode, an emissive element layer, and a second electrode formed in that order from the substrate, wherein the first electrode is a transparent electrode made of a transparent conductive material; a reflective layer for reflecting light incident from the emissive element layer or from the second substrate side is provided between the transparent electrode and the substrate; and the thickness of the transparent electrode is in a range from 1 Å to 100 Å.

According to another aspect of the present invention, there is provided a light emitting display apparatus comprising an emissive element formed on a primary surface side of a substrate and having a first electrode, an emissive element layer, and a second electrode, wherein a reflective layer for reflecting light incident from the emissive element layer or from the second electrode side is formed above the substrate as a first electrode; a transparent electrode made of a transparent conductive material and having a thickness in a range from 1 Å to 100 Å is formed to cover the reflective layer; a switching element corresponding to each pixel is provided between the reflective layer and the substrate; the switching element is connected to the reflective layer constituting the first electrode; an insulating film is formed between the reflective layer and the transparent electrode; the transparent electrode is capacitively coupled to the reflective layer via the insulating film; and a voltage supplied from the switching element to the reflective layer is applied to the transparent electrode via a capacitor formed of the reflective electrode and the transparent electrode disposed with the insulating film therebetween.

As described, in addition to a liquid crystal display apparatus, in a light emitting display apparatus, by setting a thickness of a transparent electrode in a structure comprising a reflective layer and a transparent electrode layered on a substrate within a range from 750 Å to 1250 Å or within a range from 1 Å to 100 Å, it is possible to prevent coloring of light reflected by the reflective layer and emitted upwards from the element and to achieve higher quality display.

DESCRIPTION OF PREFERRED EMBODIMENTS

Preferred embodiments of the present invention (hereinafter referred to simply as "embodiments") will now be described with reference to the drawings.

Figure 1:
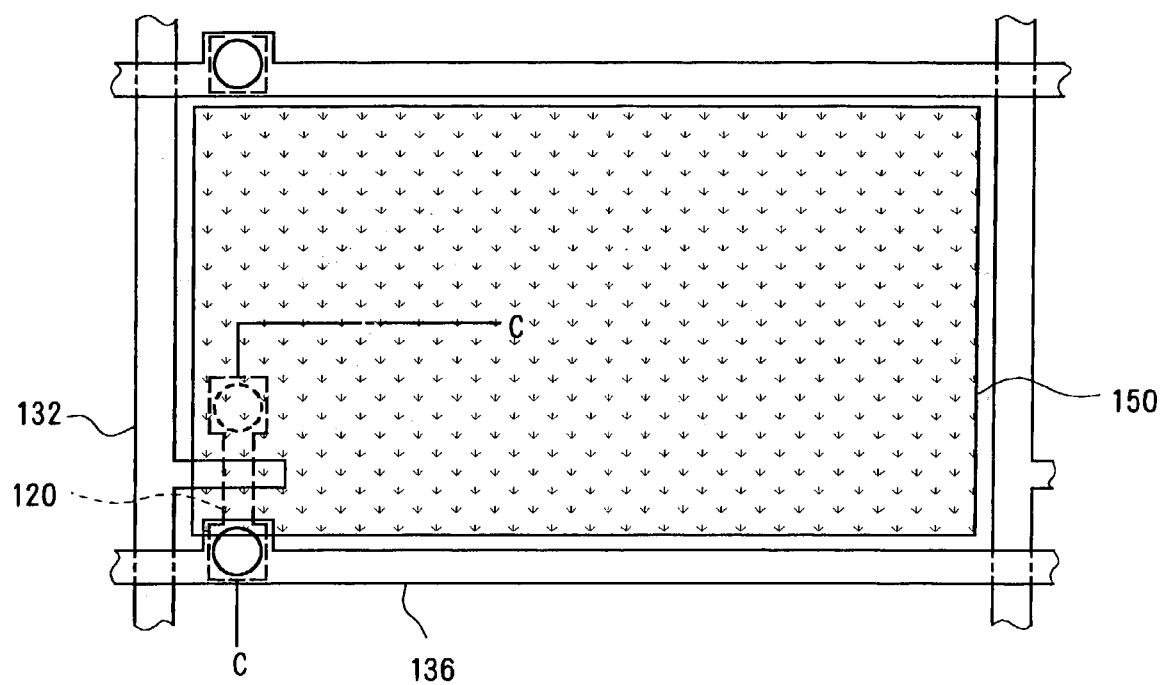
FIG. 1 is a diagram showing a planar structure of a portion of a first substrate side in a conventional active matrix reflective LCD.
Figure 2:
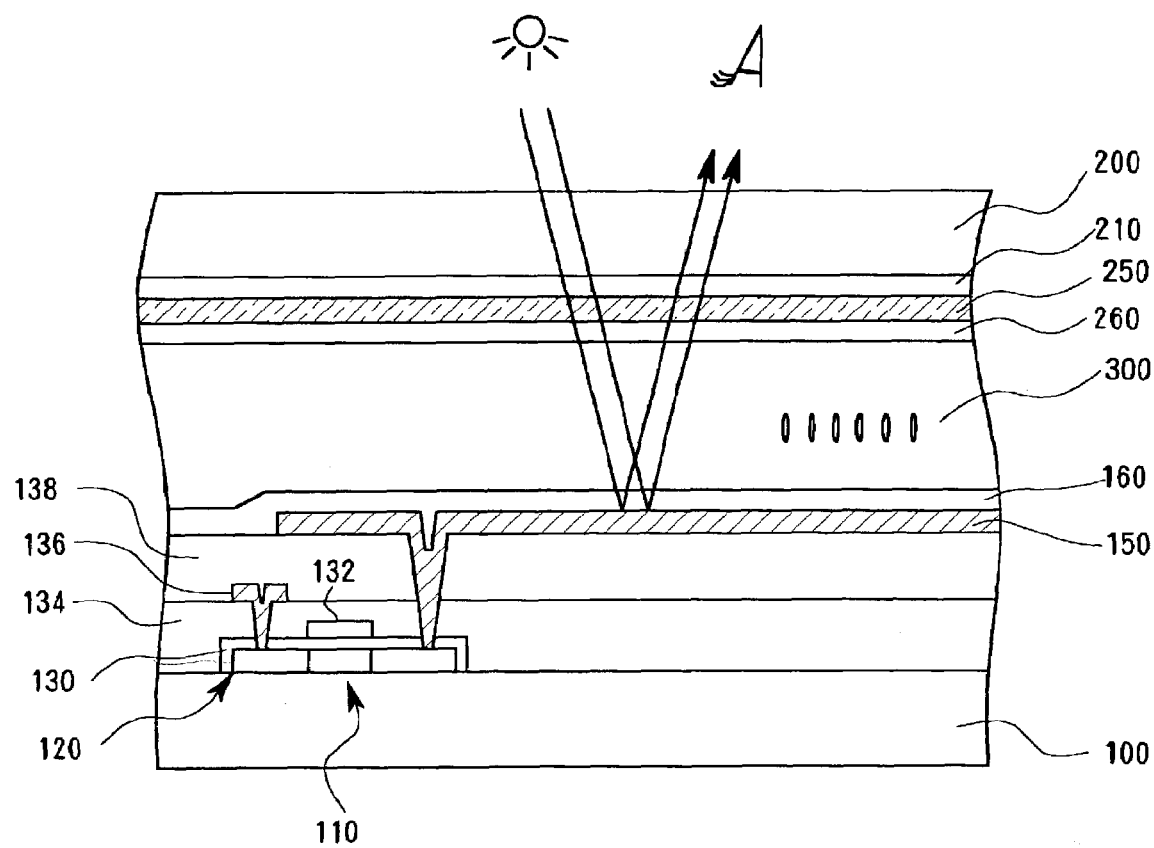
FIG. 2 is a diagram schematically showing a cross sectional structure of a conventional reflective LCD along the line C—C in FIG. 1.
Figure 3:
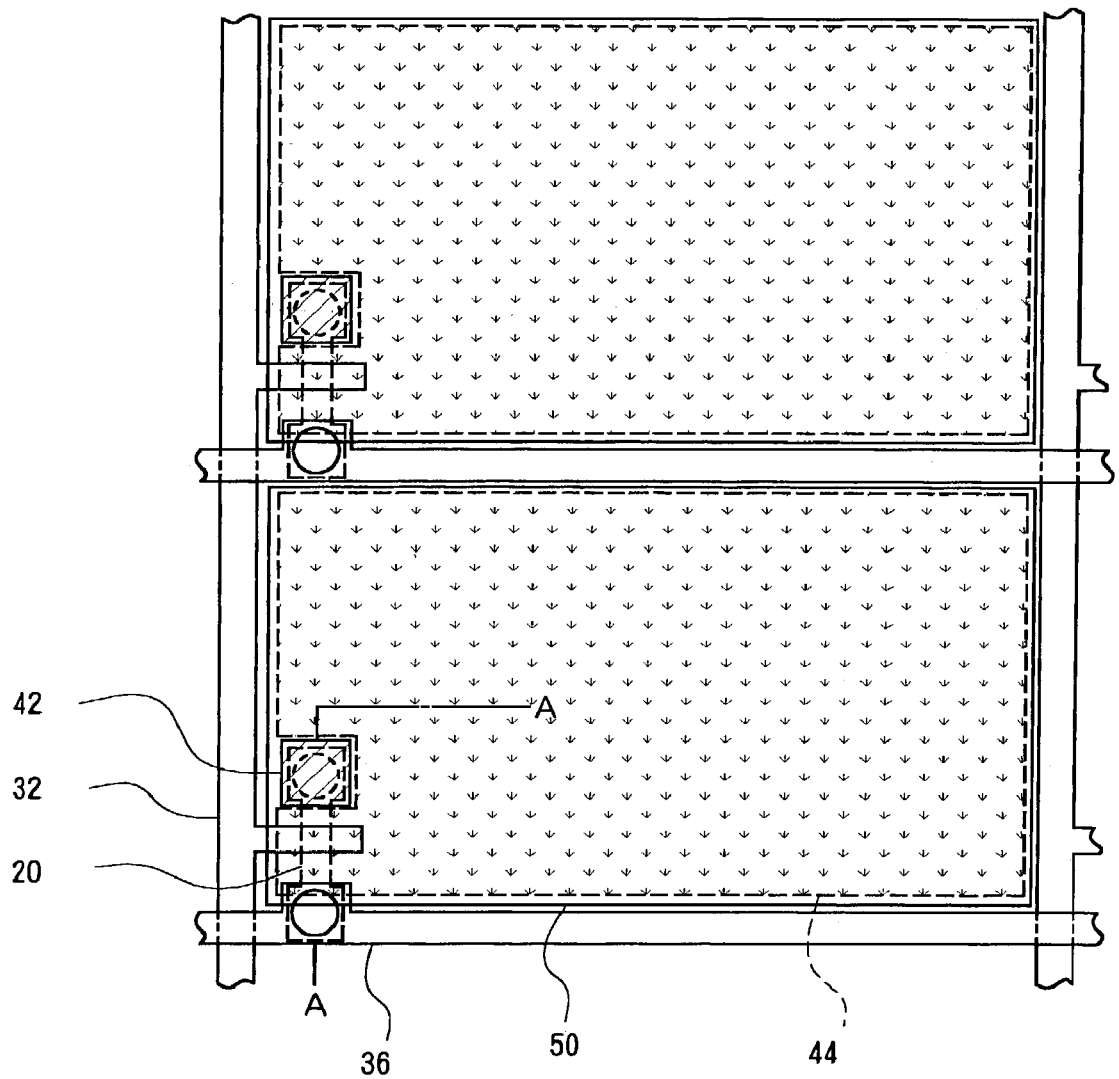
FIG. 3 is a diagram schematically showing a planar structure of a first substrate side in an active matrix reflective LCD according to a first preferred embodiment of the present invention.
Figure 4:
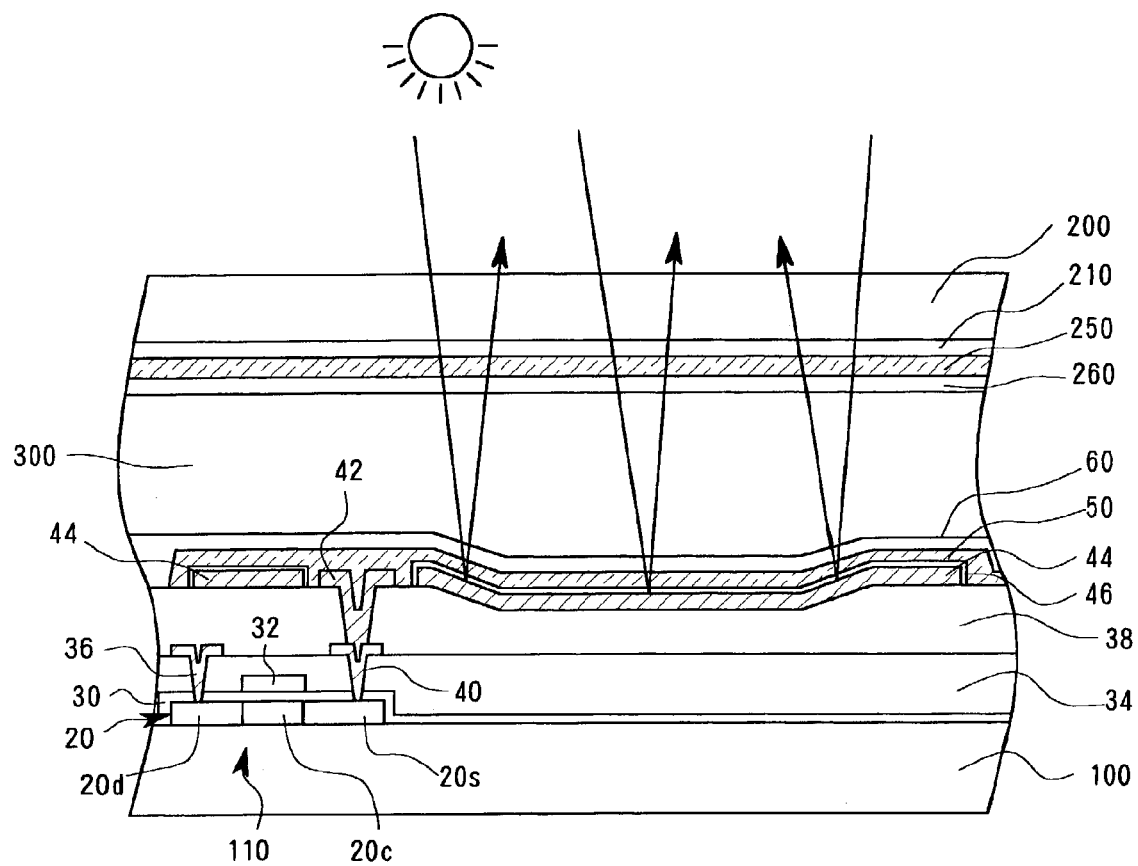
FIG. 4 is a diagram schematically showing a cross sectional structure of the reflective LCD along the line A—A of FIG. 3.

FIG. 3 shows a portion of a planar structure of a first substrate side in an example wherein a reflective active matrix LCD is employed as a reflective LCD according to a first preferred embodiment of the present invention. FIG. 4 schematically shows across sectional structure of the LCD along the line A—A of FIG. 3. In an active matrix LCD, a plurality of pixels are provided in a matrix form within a display region and a switching element such as a TFT is provided corresponding to each pixel. The switching element is formed for each pixel on one of a first substrate side and a second substrate side. In the illustrated example structure, the switching element is formed on the side of the first substrate 100. A pixel electrode (first electrode) 50 which is formed in an individual pattern is connected to the switching element.

For the first substrate 100 and the second substrate 200, a transparent substrate such as glass is used. Similar to the conventional art, on the side of the second substrate 200 opposing the first substrate 100, a color filter 210 is formed corresponding to the pixel electrode 50 for a color type structure and a second electrode 250 which is made of a transparent conductive material is formed on the color filter 210. As a transparent conductive material for the second electrode 250, IZO (Indium Zinc Oxide) or ITO is used. In an active matrix device, the second electrode 250 is formed as a common electrode for all pixels. An alignment film 260 made of polyimide or the like is formed on the second electrode 250.

In the present embodiment, the electrodes have a structure such that the electrical characteristics, with respect to a liquid crystal layer 300, of the first substrate side is matched with those of the second substrate side having a structure as described above. Specifically, as shown in FIG. 4, instead of a reflective metal electrode as in the conventional art, a first electrode 50 made of a transparent conductive material having a similar work function as the second electrode 250, that is, a material similar to the second electrode 250 such as IZO or ITO is formed immediately below an alignment film over the first substrate 100. In addition, in order to realize a reflective LCD, a reflective layer 44 for reflecting light incident from the second substrate side is formed below the first electrode 50.

By forming the first electrode 50 of the same material as used for the second electrode 250, electrodes having the same work function sandwich the liquid crystal layer 300, via the alignment layers 60 and 260, respectively, so that the liquid crystal layer 300 can be AC driven by the first and second electrodes 50 and 250 with very good symmetry. Here, the work functions of the first and second electrodes 50 and 250 need not be completely identical and may be approximately equal, as long as the values allow the liquid crystal layer 300 to be symmetrically driven. When the difference between the work functions of both electrodes is approximately 0.5 eV or less, for example, high quality display without flicker or image persistence in the liquid crystal layer can be achieved, even when the drive frequency for the liquid crystal is set to CFF or lower as described above.

In order to satisfy the above conditions for the electrodes, for example, IZO (whose work function is 4.7 eV–5.2 eV) can be used for the first electrode 50 and ITO (whose work function is 4.7 eV–5.0 eV) can be used for the second electrode 250, or vice versa. The material used for each electrode may be selected in consideration of transmittance, process properties such as patterning precision, and manufacturing cost.

As the reflective layer 44, a material having a superior reflective characteristic such as Al, Ag, or an alloy of these (in the present embodiment, an Al—Nd alloy) is used at least on the front surface side (the side facing the liquid crystal layer). The reflective layer 44 may be a single layer of a metal material such as Al, or, alternatively, a layer of refractory metal (high melting point metal) such as Mo may be formed as a lower buffer layer which contacts the planarization insulating film 38. By forming such a lower buffer layer, the contact between the reflective layer 44 and planarization insulating film 38 can be improved, and, consequently, the reliability of the element can be enhanced. In the structure shown in FIG. 4, an inclined surface having a desired angle is formed within each pixel region of the planarization insulating film 38. By layering a reflective layer 44 covering the planarization insulating film 38, a similar inclined surface is formed on the surface of the reflective layer 44. By forming such an inclined surface with optimum angle and position, it is possible to collect external light in each pixel and emit the collected light, allowing for improvement in, for example, display brightness in positions directly in front of the display. Alternatively, no inclined surface may be provided.

The reflective layer 44, which is made of a conductive material such as an Al—Nd alloy, as described above, is electrically insulated from the first electrode 50 formed on the reflective layer 44 because the first electrode 50 is formed by sputtering IZO or ITO, when these materials are used. More specifically, because when the reflective layer 44 made of Al or the like is exposed to the sputtering atmosphere, an oxidation reaction occurs on the surface of the reflective layer 44 and the reflective layer 44 is covered with a natural oxide film. Therefore, according to the present embodiment, rather than using this reflective layer 44 as a first electrode for driving the liquid crystal as in the conventional reflective LCD, the transparent conductive layer formed on the reflective layer 44 is used as the first electrode 50 for applying a voltage corresponding to the display content to the liquid crystal layer 300.

With the above structure, in the present embodiment, the thickness of the transparent first electrode 50 is set to (a) 100 Å or less, more specifically, in a range from 1 Å to 100 Å, and more preferably in a range from 10 Å to 100 Å. Alternatively, the thickness of the transparent first electrode 50 is set (b) in a range from 750 Å to 1250 Å, for example, approximately 1000 Å. Even when a transparent material such as IZO and ITO is used, the transmittance of light is not 100% and influences such as wavelength dependence may be present. In particular, in a reflective LCD as in the present embodiment, because the light entering from the second substrate side transmits through the liquid crystal layer 300, is reflected by the reflective layer 44, and is emitted to the outside from the second substrate side, the light transmits through the first electrode 50 twice. Therefore, influences such as coloring and reduction in transmittance become significant if optical characteristics of the first electrode 50 are not taken into account. By setting the thickness of the first electrode 50 within Range (a) or (b) as described above, it is possible to prevent coloring and reduction in transmittance. When the thickness of the first electrode 50 is to be set in a range as described above, it is desirable that the thickness of the opposing electrode 250 made of a similar transparent electrode material is set approximately 800 Å to 1500 Å (for example, 1300 Å). In the present embodiment, the thickness of the reflective layer 44 is set approximately 500 Å to 1500 Å (for example, approximately 1000 Å).

Figure 5:
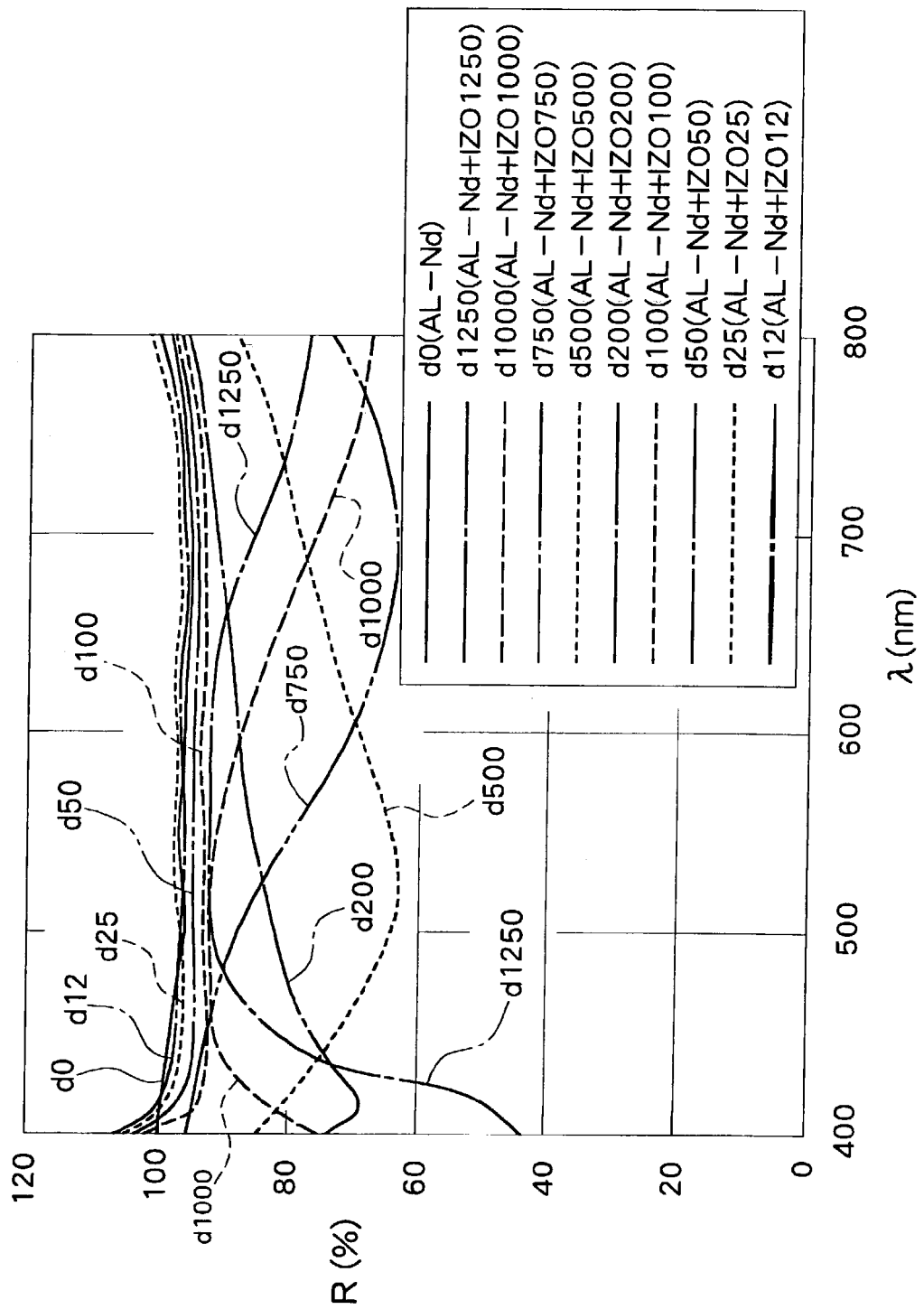
FIG. 5 is a diagram showing a wavelength dependency of the reflectance at various thicknesses of the first electrode in the first preferred embodiment of the present invention.

FIG. 5 shows a wavelength dependency of reflectance when the first electrode 50 made of IZO is formed on the reflective layer 44 with various thicknesses d. In FIG. 5, the horizontal axis represents the wavelength of incident light λ (nm) and the vertical axis represents the reflectance R (%). The thicknesses d of the first electrode 50 are set as follows: d=0 Å, 12 Å, 25 Å, 50 Å, 100 Å, 200 Å, 500 Å, 750 Å, 1000 Å, and 1250 Å. An Al—Nd alloy having a thickness of 1000 Å is used as the reflective layer 44. As is clear from FIG. 5, when the thickness d is 12 Å, 25 Å, 50 Å, or 100 Å, a reflectance of almost 100% is achieved in the entire wavelength range of 400 nm to 800 nm similar to the case when d equals 0 Å, i.e., when the first electrode 50 is not formed. On the other hand, when the thickness d is 200 Å or 500 Å, the reflectance of 100% is not achieved in the entire wavelength range. When the thickness d is 750 Å, the reflectance is not too high on the longer wavelength side, but a relatively high reflectance can be achieved at wavelengths lower than 600 nm.

Figure 6:
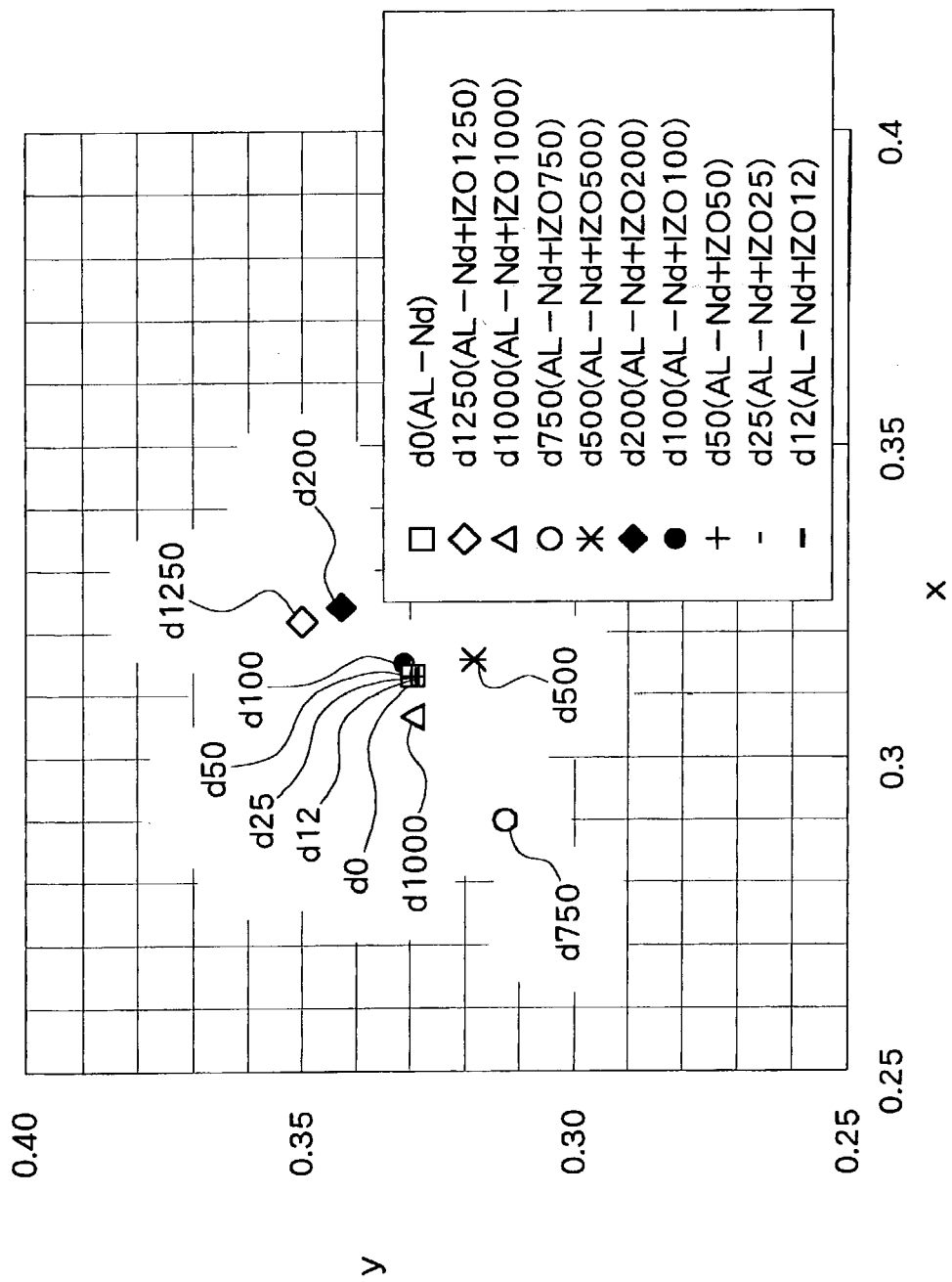
FIG. 6 is a diagram showing coordinates on the CIE chromaticity diagram at various thicknesses of the first electrode in the first preferred embodiment of the present invention.

FIG. 6 shows a CIE chromaticity diagram for a case wherein a first electrode 50 made of IZO is formed on a reflective layer 44 made of an Al—Nd alloy with various thicknesses d. The thickness d of the first electrode 50 is chosen similar to FIG. 5, that is, d=0 Å, 12 Å, 25 Å, 50 Å, 100 Å, 200 Å, 500 Å, 750 Å, 1000 Å and 1250 Å. As shown in FIG. 6, when the thickness d is 12 Å, 25 Å, 50 Å, 100 Å, or 1000 Å, coordinates in the CIE chromaticity diagram are similar to the case where the thickness d is 0 Å, that is, when the first electrode 50 is not formed, which indicates that a color reproducibility similar to the case when the first electrode 50 is not formed can be achieved.

TABLE 1

|  | x | y | Y |
|---|---|---|---|
| d0 (Al—Nd) | 0.313 | 0.330 | 98.8 |
| d1250 (Al—Nd + IZO1250) | 0.322 | 0.349 | 94.8 |
| d1000 (Al—Nd + IZO1000) | 0.307 | 0.330 | 92.6 |
| d750 (Al—Nd + IZO750) | 0.290 | 0.312 | 79.0 |

TABLE 1-continued

|  | x | y | Y |
|---|---|---|---|
| d500 (Al—Nd + IZO500) | 0.316 | 0.319 | 68.7 |
| d200 (Al—Nd + IZO200) | 0.324 | 0.343 | 88.4 |
| d100 (Al—Nd + IZO100) | 0.315 | 0.331 | 95.8 |
| d50 (Al—Nd + IZO50) | 0.313 | 0.329 | 97.6 |
| d25 (Al—Nd + IZO25) | 0.313 | 0.329 | 98.3 |
| d12 (Al—Nd + IZO12) | 0.313 | 0.330 | 98.8 |

$Y = K \int S(\lambda) \cdot R(\lambda) \cdot y(\lambda) \, d\lambda$ $S(\lambda)$ SPECTRAL DISTRIBUTION OF ILLUMINATION LIGHT $R(\lambda)$ SPECTRAL REFLECTANCE OF SAMPLE LIGHT $y(\lambda)$ ISOCHROMATIC FUNCTION $\lambda$ WAVELENGTH (RANGE OF INTEGRATION IS PRIMARILY FROM 380 nm TO 780 nm)

Table 1 shows coordinate values for x and y and a Y value for various thicknesses d of the first electrode 50 of FIG. 6. The Y value is an indication of the reflectance and as the Y value approaches the value of 100, the emitted light becomes brighter. In other words, as the Y value approaches the value of 100, the Y value indicates that there is less attenuation by the first electrode 50 in the present embodiment. Referring to Table 1, it can be seen that when the thickness d is 12 Å, 25 Å, 50 Å, 100 Å, 1000 Å, or 1250 Å, the Y value is 90 or greater, and is very high even in comparison with the Y value of 98.8 for the case of d=0 Å. Although not as high as in the above described cases, a thickness of 750 Å also yields a relatively high Y value of 79.0.

Based on the above measurements and findings, it can be seen that a suitable value for the thickness d of the first electrode 50 to be formed on the reflective layer 44 is (a) 100 Å or less or (b) approximately 750 Å to 1250 Å. With regard to the condition (a), the thickness d must be greater than 0 Å in order to maintain symmetry of driving with the common electrode 250, and therefore, the thickness d is set to, for example, 1 Å or greater, and more preferably, to 10 Å or greater in consideration of the reliability of the processes. With regard to the condition (b), it is more preferable that the thickness d be greater than 750 Å and smaller than 1250 Å, and it is even more preferable that the thickness d be approximately 1000 Å in consideration of the optical characteristics, coverage with respect to the unevenness of lower layers, and resistance.

In recent years, transflective LCDs which have both the light transmitting functionality and the reflective functionality have been proposed. As the transflective LCD, a structure is known wherein a pixel electrode made of a material such as ITO is formed similar to the transmissive LCDs and a reflective layer made of a material such as Al is layered to cover a partial region of the transparent electrode. In such a transflective LCD, when a transparent electrode layer and a reflective electrode layer are layered in that order from the substrate side, the two electrode layers are electrically connected and function as a pixel electrode. However, as described above, because a reflective electrode layer is disposed on the side facing the liquid crystal layer, a difference in the work function of the reflective electrode layer and the second electrode causes a problem in that the liquid crystal layer 300 cannot be symmetrically driven. To this end, in order to improve the electrical symmetry, a structure can be employed in which the order of layering of the electrode layers is inverted, but a natural oxide film tends to be formed on a metal material such as Al or an Ag-based metal used for the reflective electrode as described above. In particular, when a sputtering process for forming a transparent conductive material layer is applied after the metal layer is formed, a natural oxide film covers the surface of the metal layer and the metal layer and the transparent electrode are insulated. Therefore, simple inversion of the order of layering of the electrodes does not allow driving of liquid crystal by the transparent electrode on the first substrate side.

In consideration of the above, in the present embodiment, the reflective layer 44 is insulated from both the first electrode 50 and the TFT 110 and a connection metal layer 42 is interposed between the first electrode 50 and the TFT 110 (for example, a source electrode 40 of the TFT 110) to connect the first electrode 50 and the TFT 110. With such a structure, the liquid crystal can be driven by the first electrode 50 made of a transparent conductive material disposed near the liquid crystal layer on the first substrate side similar to the second substrate side.

Conditions that must be satisfied by the metal layer 42 used in the present embodiment for connecting the first electrode 50 and the TFT 110 include: (i) that an electrical connection with the first electrode 50 made of IZO, ITO, or the like can be established; (ii) that, when, for example, a source electrode 40 made of a material such as Al is provided in the TFT 110 as shown in FIG. 4, an electrical connection with the source electrode 40 can be established, and when the source electrode 40 is omitted, an electrical connection with a semiconductor (for example, polycrystalline silicon in the present embodiment) active layer can be established; and (iii) that the metal layer 42 is not removed by an etching solution for the reflective layer 44 when the reflective layer 44 is patterned into individual shapes for each pixel. As a material for the metal layer 42 satisfying these conditions, it is preferable that a refractory or high melting point metal such as Me, Ti, and Cr is used.

Next, a structure for reliably connecting the first electrode 50 and the corresponding TFT 110 in the present embodiment and a method for manufacturing such a structure will be described.

In this description, a structure is exemplified in which a top gate type TFT is used as the TFT 110 and polycrystalline silicon (p-Si) obtained by polycrystallizing amorphous silicon (a-Si) through laser annealing is used for the active layer 20. The TFT 110 is not limited to a top gate type p-Si TFT and may alternatively be of a bottom gate type and a-Si may be used in the active layer. Impurities doped into a source region 20s and a drain region 20d of the active layer 20 of the TFT 110 maybe either of an n conductive type or of a p conductive type. In the present embodiment, n conductive type impurities such as phosphorus is doped to realize an n-ch type TFT 110.

The active layer 20 of the TFT 110 is covered by a gate insulating film 30. A gate electrode 32 which is made of Cr or the like and which also functions as a gate line is formed on the gate insulating film 30. After the gate electrode 32 is formed, the impurities as described above are doped into the active layer 20 with the gate electrode 32 acting as a mask so that a source region 20s, a drain region 20d, and a channel region 20c into which no impurity is doped are formed. Then, an interlayer insulating film 34 is formed to entirely cover the TFT 110, contact holes are formed in the interlayer insulting film 34, and a layer of an electrode material is formed so that a source electrode 40 is connected to the source region 20s of the p-Si active layer 20 and a drain electrode 36 is connected to the drain region 20d of the p-Si active layer 20 through the respective contact hole. In the present embodiment, the drain electrode 36 also functions as a data line for supplying a data signal corresponding to display content to each TFT 110. The source electrode 40 is connected to the first electrode 50 which is a pixel electrode, as will be described later.

After the source electrode 40 and the drain electrode 36 are formed, a planarization insulating film 38 made of a resin material such as an acrylic resin is formed to entirely cover the substrate. A contact hole is formed in the formation region of the source electrode 40 and a connection metal layer 42 is formed in the contact hole so that the source electrode 40 and the metal layer 42 are connected. When Al or the like is used as the material for the source electrode 40, by using a metal material such as Mo for the metal layer 42, it is possible to achieve a superior ohmic contact between the source electrode 40 and the metal layer 42. It is also possible to omit the source electrode 40, in which case, the metal layer 42 contacts the silicon active layer 20 of the TFT 110. A metal such as Mo can establish an ohmic contact with such a semiconductor material.

After the connection metal layer 42 is layered and patterned, a material having superior reflective characteristics such as an Al—Nd alloy and Al which forms the reflective layer 44 is layered on the entire surface of the substrate through deposition or sputtering. The layered reflective material is etched and at least a portion around the source region of the TFT 110 (formation region of the metal layer 42) is removed so as to not block the connection between the metal layer 42 and the first electrode 50 to be formed later, resulting in a reflective layer 44 having a pattern as shown in FIG. 3 in each pixel. In order to prevent generation of a leak current by light irradiating onto the TFT 110 (in particular, the channel region 20c) and to provide a maximum area for the region which can reflect (that is, a display region), in the present embodiment, the reflective layer 44 is actively formed also in a region above the channel region of the TFT 110 as shown in FIG. 3.

In consideration of the patterning process of such a reflective layer 44, the metal layer 42 made of a material such as Mo as described above has a sufficient thickness (for example, 0.2 μm) and a sufficient tolerance to the etching solution. Therefore, the metal layer 42 can remain within the contact hole without being completely removed even after the reflective layer 44 on the metal layer 42 is removed by etching. Because the source electrode 40 or the like is formed of a material similar to that of the reflective layer 44 (for example, Al or the like) in many cases, when the metal layer 42 is not present, the source electrode 40 is corroded by the etching solution for the reflective layer 44, resulting in disconnection or the like. By providing a metal layer 42, it is possible to tolerate the patterning process of the reflective layer 44 and maintain superior electrical connection with the source electrode 40.

After the reflective layer 44 is patterned, a transparent conductive layer having a thickness satisfying the above described conditions is layered through sputtering covering the entire surface of the substrate including the reflective layer 44. As described above, in this process, the surface of the reflective layer 44 made of Al or the like is covered by an insulating natural oxide film 46. However, the surface of a refractory metal such as Mo is not oxidized even when the refractory metal is exposed to the sputtering atmosphere. Therefore, an ohmic contact can be provided between the metal layer 42 exposed in the contact region and the transparent conductive layer layered on the metal layer 42 to be used as the first electrode. After the transparent conductive layer is formed, the transparent conductive layer is patterned into a shape independent for each pixel as shown in FIG. 3 so that a pixel electrode (first electrode) 50 is obtained. After the first electrode 50 is formed in each pixel region, an alignment film 60 made of polyimide or the like is formed to cover the entire surface of the substrate and the first substrate side is completed. Then, the first substrate 100 and a second substrate 200 on which various layers up to the alignment film 260 are formed is affixed to each other at the peripheral sections of the substrates with a predetermined gap in between, liquid crystal is sealed between the substrates, and a liquid crystal display apparatus is obtained.

Next, a transflective LCD will be described. In the above description, a reflective LCD in which the reflective layer 44 is formed almost in the entire region of a pixel region has been described. The present invention, however, is not limited to reflective LCDs and can also be applied to transflective LCDs.

Figure 7:
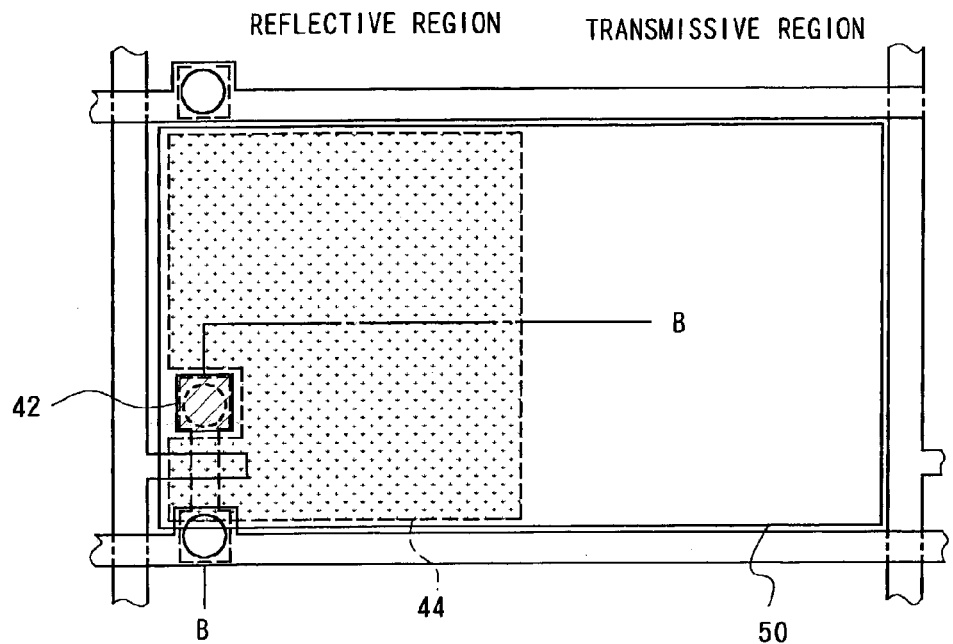
FIG. 7 is a diagram schematically showing a planar structure of a first substrate side of an active matrix transflective LCD according to the first preferred embodiment of the present invention.
Figure 8:
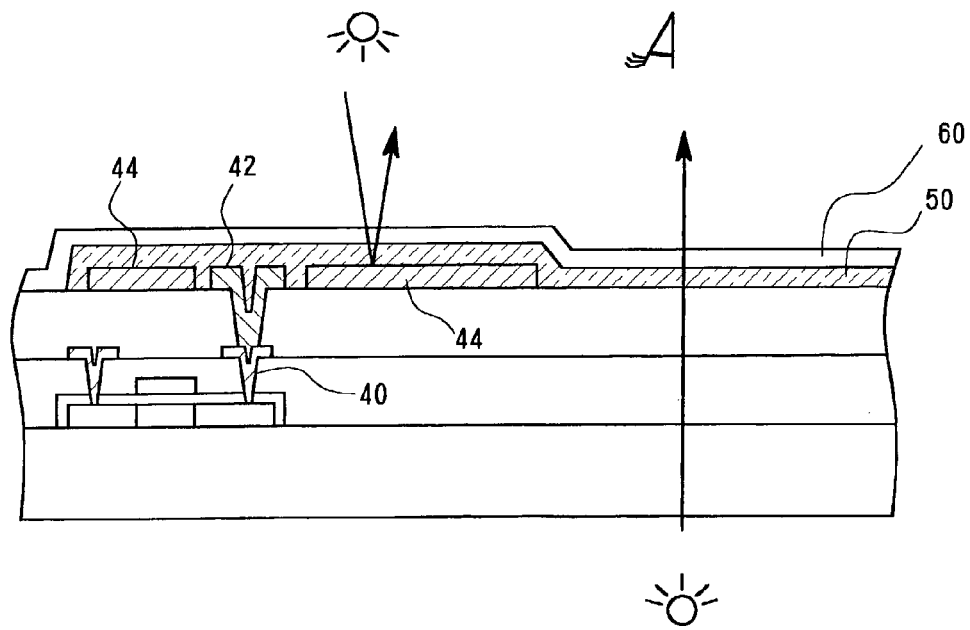
FIG. 8 is a diagram schematically showing a cross sectional structure of the transflective LCD along the line B—B of FIG. 7.

FIG. 7 shows a planar structure of a pixel in a transflective active matrix LCD and FIG. 8 shows a cross sectional structure of the LCD along the line B—B of FIG. 7. In the reflective LCD shown in FIGS. 3 and 4, the reflective layer 44 is formed in almost the entire region of a pixel region (excluding the contact region with the TFT). In contrast, in a transflective LCD as shown in FIGS. 7 and 8, a reflective region and a light transmissive region are formed within a pixel. In the reflective region, a reflective layer 44 and a transparent first electrode having a thickness of 100 Å or less or a thickness of approximately 750 Å to 1250 Å are layered and in the light transmissive region, the reflective layer 44 is removed and only the transparent first electrode 50 is formed.

In the present embodiment, in such a transflective LCD also, a first electrode 50 is disposed more proximate to the liquid crystal layer side than is the reflective layer 44. The reflective layer 44 is insulated from the first electrode 50 formed immediately above the reflective layer 44 by a natural oxide film 46 and is removed in the region of contact between the TFT 110 and the first electrode 50 so as to not block the contact between the TFT 110 and the first electrode 50. Therefore, with such a structure of a transflective LCD, it is possible to symmetrically AC drive the liquid crystal layer 300 by the first electrode 50 and a second electrode 250 having similar work functions via respective alignment films. In addition, by switching the light source based on conditions such as the intensity of the ambient light, it is possible to achieve both reflective display and transmissive display. Here, because the thickness of the first electrode 50 is set in the range as described above, coloring and reduction in reflectance caused by the first electrode 50 during the reflective display can be prevented and it is possible to easily obtain high quality for both the reflective display and the transmissive display.

Figure 9:
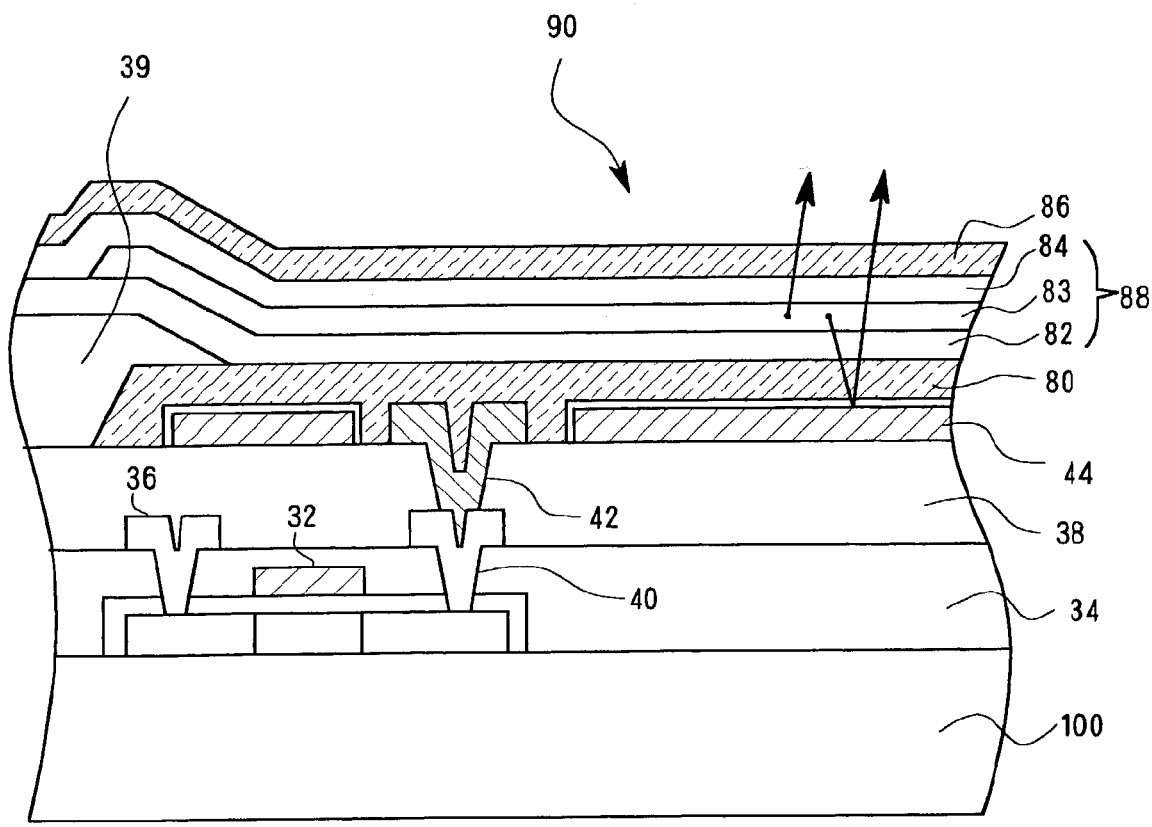
FIG. 9 is a diagram schematically showing a cross sectional structure of an active matrix organic EL display according to the present invention.

In the above description, a reflective LCD and a transflective LCD having a reflective layer 44 are exemplified, but the present invention is not limited to such devices and the structure of the switching element (TFT), the connection metal layer, the reflective layer, and the transparent first electrode can be applied to other light emitting display devices such as, for example, an EL display device. By employing such a configuration, it is possible to reliably connect the first electrode and the TFT provided below the first electrode while providing a reflective functionality in the lower section of the first electrode. FIG. 9 shows a partial cross sectional structure in each pixel of an active matrix EL display according to the present embodiment.

An element employed in the EL display device shown in FIG. 9 is an organic EL element 90 wherein an organic compound is used as a light emitting material. In the organic EL element 90, an organic element layer 88 is formed between an anode 80 and a cathode 86. The organic element layer 88 comprises an emissive layer 83 containing at least an organic light emitting molecule, and can be formed with a single-layer structure or a multi-layered structure of two, three, or more layers, according to the characteristics and emission color of the organic compound. In the example structure of FIG. 9, the organic element layer 88 comprises a hole transport layer 82, an emissive layer 83, and an electron transport layer 84 formed in that order from the side of the anode 80 placed on the side of the substrate 100. The emissive layer 83 is individually patterned for each pixel similar to the anode 80 and the hole transport layer 82 and the electron transport layer 84 are formed to be common to all pixels similar to the cathode 86. For the purpose of insulating anodes 80 between adjacent pixels and preventing, in the edge region of the anode 80, shoring of the anode 80 with the cathode 86 provided above, a planarization insulating film 39 is formed in the inter-anode region of adjacent pixels.

In the organic EL element 90 having a structure as described above, holes injected from the anode 80 and electrons injected from the cathode 86 recombine in the emissive layer 83 to excite the organic light emitting molecules and light is emitted when the excited molecules return to the ground state. As is clear, the organic EL element 90 is a current driven light emitting element and the anode 80 must have a capability to sufficiently inject holes to the organic element layer 88. Because of this, a transparent conductive material such as ITO and IZO which has a high work function is used in many cases. Therefore, in many cases, the light from the emissive layer 83 transmits from the side of the transparent anode 80 through the transparent substrate 10 and is emitted to the outside. In the active matrix organic EL display device as shown in FIG. 9, because a reflective layer 44 is formed below the anode 80, it is possible to emit light from the cathode side.

More specifically, in the display of FIG. 9, a configuration similar to, for example, the TFT 110, the metal layer 42, the reflective layer 44, and the first electrode 50 as shown in FIG. 4 is employed for the TFT 110 for driving the organic EL element 90, the metal layer 42, the reflective layer 44, and the anode 80 of the organic EL element 90. The thickness of the first electrode 50 is set to be 100 Å or less or to approximately 750 Å to 1250 Å. As the cathode 86 of the organic EL element 90, a transparent conductive material such as ITO and IZO can be used similar to the anode 80, or, alternatively, the cathode 86 may be formed of a metal material such as Al and Ag with a thin thickness that allows light to transmit through (alternatively, an opening may be formed). By employing such a configuration, a top emission type structure can be realized wherein the light from the emissive layer 83 can be efficiently emitted to the outside from the side of the cathode 86. When a configuration is employed wherein R, G, and B light is emitted from corresponding pixels, by employing an anode 80 (first electrode) with a thickness in the range as described above, it is possible to realize a high reflectance for all of the colors. It is also possible to reflect the light transmitting towards the anode 80 by the reflective layer 44 and emit, from the side of the cathode 86, the light which is obtained at the emissive layer 83 without attenuation or coloring caused by the anode 80. Therefore, it is possible to realize a display with a very high brightness.

In the above description, structures have been described wherein a transparent first electrode is connected to a TFT. When the thickness of the transparent first electrode is to be set to 100 Å or less, however, the electrical resistance of the transparent first electrode is high. It is therefore preferable to connect the lower reflective layer 44 to the TFT, use the reflective layer 44 substantially as the first electrode, and drive the liquid crystal with the second electrode instead of connecting the transparent first electrode to the TFT and driving the liquid crystal. Alternatively, when the reflective electrode 44 is connected to the TFT 44, by setting the thickness of the transparent first electrode approximately 750 Å to 1250 Å similar to the above, superior optical characteristics can be obtained. In order to connect the TFT to the reflective layer 44 as described above and drive the liquid crystal, for example, it is possible to employ a structure wherein while an Mo layer or the like is formed in a partial region of the reflective pixel electrode to maintain connection with the transparent electrode 50 provided above and the reflective pixel electrode 44 is connected to the TFT. Alternatively, it is also possible to employ, when the transparent first electrode and the reflective electrode 44 are not to be electrically connected, a configuration wherein a natural oxide film is formed to cover the reflective pixel electrode 44 connected to the TFT, the reflective pixel electrode 44 is capacitively coupled via the natural oxide film to the transparent electrode 50 which is insulated from the reflective pixel electrode 44 via the natural oxide film, and the capacitor applies a voltage for driving the liquid crystal from the reflective pixel electrode 44 to the transparent electrode 50.

As described, according to the first embodiment, even when a reflective layer must be formed on one of the substrate sides such as in reflective LCDs and in transflective LCDs, a first electrode and a second electrode having similar characteristics can be disposed in equivalent positions with respect to the liquid crystal layer. By setting the thickness of the transparent first electrode to 100 Å or less or approximately 750 Å to 1250 Å, it is possible to prevent coloring and reduction in reflectance caused by the first electrode disposed in front of the reflective layer. In addition, by increasing the thickness within the range described above, it is possible to reduce the resistance of the first electrode and prevent disconnection. Therefore, it is possible to symmetrically AC drive the liquid crystal and, at the same time, a high quality display can be realized.

Referring to the drawings, a second preferred embodiment of the present invention will now be described in which a transparent electrode 50 is driven by a capacitor as described above.

Figure 10:
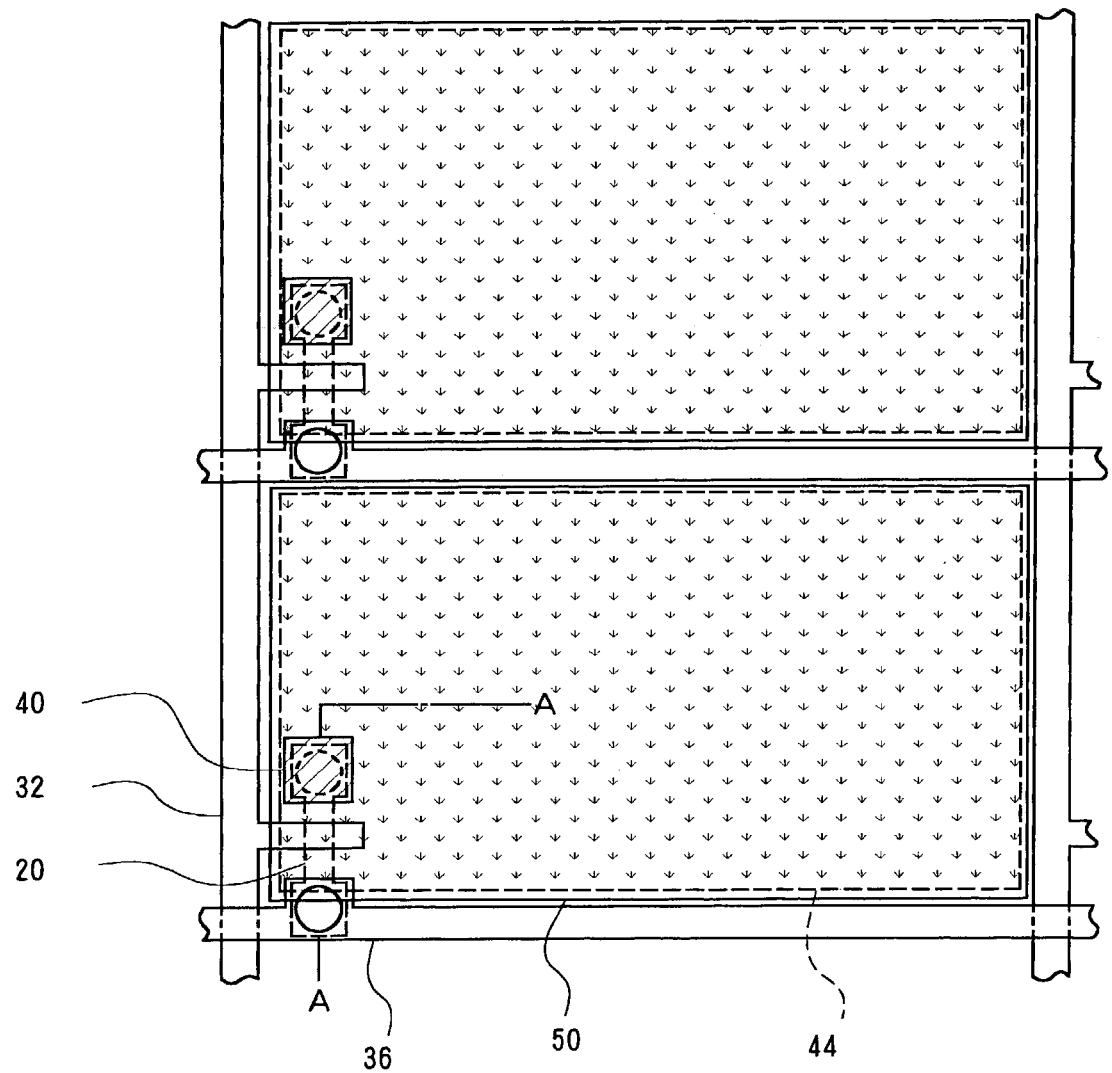
FIG. 10 is a diagram schematically showing a planar structure of a first substrate side of an active matrix reflective LCD according to a second preferred embodiment of the present invention.
Figure 11:
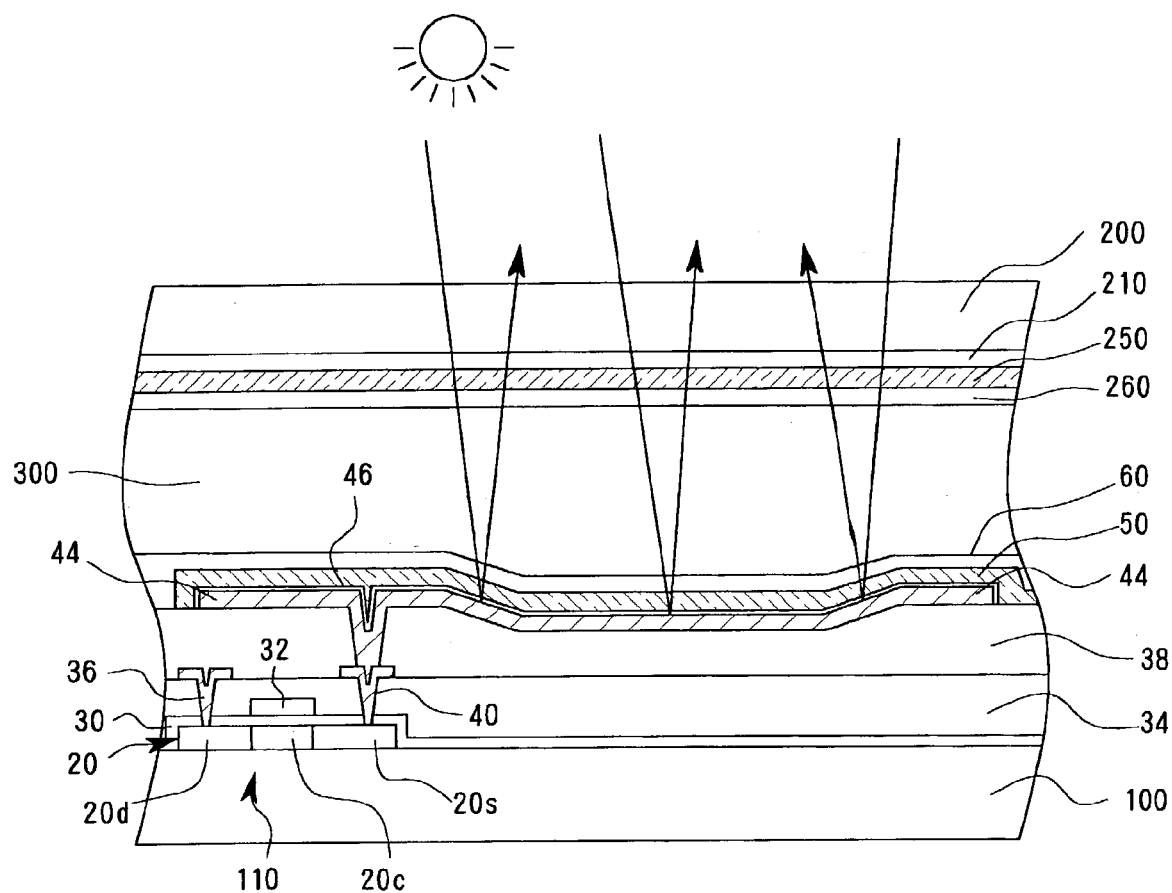
FIG. 11 is a diagram schematically showing the cross sectional structure of the reflective LCD along the line A—A of FIG. 10.

FIG. 10 shows a portion of a planar structure of a first substrate side of a reflective active matrix LCD as an example reflective LCD according to the second embodiment. FIG. 11 schematically shows a cross sectional structure of the LCD along the line A—A of FIG. 10. In these drawings, components already described above will be assigned the same reference numerals and will not be further described. A difference from the structure described above is that a reflective electrode 44 made of a reflective metal material and respectively formed on a planarization insulating film 38 is connected to a TFT 110 (in this example structure, a source electrode of the TFT 110) and a transparent first electrode 50 made of a transparent conductive material is formed in an individual pattern above the reflective electrode 44 with an insulating film 46 between the electrodes 44 and 50.

When a gate signal (scan signal) is applied to agate electrode 32 of the TFT 110, the TFT 110 is switched on, causing, for example, the voltage of the side of the source electrode 40 to become equal to the data signal voltage applied to a drain electrode (data line) 36. Because the reflective electrode 44 is connected to the source electrode 40, the source voltage is applied to the reflective electrode 44.

The reflective electrode 44 is covered by a natural insulating film 46 which is formed when a first electrode 50 made of a transparent conductive material having a work function similar to that of the second electrode 250 of the second substrate side such as ITO and IZO is formed through sputtering. The transparent first electrode 50 is formed with the insulating film 46 between the transparent first electrode 50 and the reflective electrode 44. In the second embodiment, the reflective electrode 44 and the first electrode 50 are capacitively coupled with the insulating film 46 therebetween and a data voltage corresponding to display content applied to the reflective electrode 44 is applied to the first electrode 50 via the capacitor.

By forming the first electrode 50 of the same material as used for the second electrode 250, electrodes having the same work function sandwich the liquid crystal layer 300, via the alignment layers 60 and 260, respectively, so that the liquid crystal layer 300 can be AC driven by the first and second electrodes 50 and 250 with very good symmetry. Here, the work functions of the first and second electrodes 50 and 250 need not be exactly identical, as long as the functions allow the liquid crystal layer 300 to be symmetrically driven. When the difference between the work functions of both electrodes is approximately 0.5 eV or less, for example, high quality display without flicker or image persistence in the liquid crystal layer can be achieved, even when the drive frequency for the liquid crystal is set to CFF or lower as described above.

In order to satisfy the above conditions for the electrodes, for example, IZO (whose work function is 4.7 eV–5.2 eV) can be used for the first electrode 50 and ITO (whose work function is 4.7 eV–5.0 eV) can be used for the second electrode 250, or vice versa. The material used for each electrode may be selected in consideration of qualities such as transmittance, process properties such as patterning precision, and manufacturing cost.

As the reflective layer 44, a material having a superior reflective characteristic such as Al, Ag, or an alloy of these (in the present embodiment, an Al—Nd alloy) is used at least on the front surface side (the side facing the liquid crystal layer). The reflective layer 44 may be a single layer of a metal material such as Al, or, alternatively, a layer of refractory metal (high melting point metal) such as Mo may be formed as a lower buffer layer which contacts the planarization insulating film 38. By forming such a lower buffer layer, the contact between the reflective layer 44 and planarization insulating film 38 can be improved, and, consequently, the reliability of the element can be enhanced. In the structure shown in FIG. 11, similar to the structure of FIG. 4 described earlier, an inclined surface having a desired angle is formed within each pixel region of the planarization insulating film 38 formed on an interlayer insulating film 34. By layering a reflective layer 44 covering the planarization insulating film 38, a similar inclined surface is formed on the surface of the reflective layer 44. By forming such an inclined surface with optimum angle and position, it is possible to collect external light in each pixel and emit the collected light, allowing for improvements in, for example, display brightness in positions directly in front of the display. Alternatively, no inclined surface may be provided.

The reflective layer 44, which is made of a conductive material such as an Al—Nd alloy, as described above, is electrically insulated from the first electrode 50 formed on the reflective layer 44 because, as described earlier, the first electrode 50 is formed by sputtering IZO or ITO, when these materials are used. More specifically, because when the reflective electrode 44 made of Al or the like is exposed to the sputtering atmosphere, an oxidation reaction occurs on the surface of the reflective electrode 44 and the reflective electrode is covered with a natural oxide film (insulating film) 46.

Figure 12:
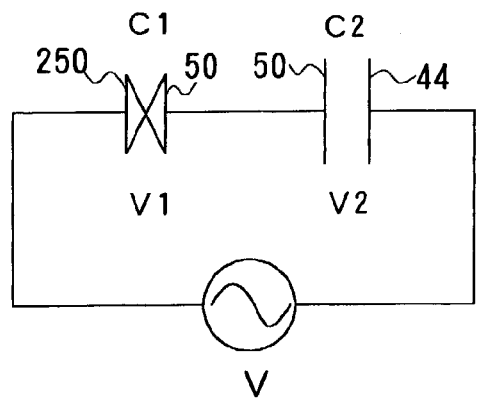
FIG. 12 is a diagram showing an equivalent circuit of a pixel according to the second preferred embodiment of the present invention.

In the second embodiment, the reflective electrode 44 is connected to the TFT 110 (here, the source electrode 40) similar to the reflective electrode of the first substrate side for driving liquid crystal in a conventional reflective LCD. On the other hand, the reflective electrode 44 and the first electrode 50 are insulated by the natural oxide film 46 described above and form a second capacitor (C2) with the natural oxide film 46 formed therebetween. In addition, a first capacitor (pixel capacitor) (C1) is formed by the first electrode 50 and the second electrode 250 which are disposed to oppose each other and sandwich the liquid crystal layer 300. As shown in FIG. 12, the first capacitor (C1) and the second capacitor (C2) within a pixel are electrically equivalent to a circuit connected in series to an AC power source. Here, $$V = V1\text{(voltage of first capacitor)} + V2\text{(voltage of second capacitor)} \qquad (1)$$

A capacitance value C between the electrodes can be represented by the following equation (2).

$$C = \in \times \in_0 \times (S/d) \qquad (2)$$

wherein $\in$ represents a dielectric constant of the material between electrodes, $\in_0$ represents a dielectric constant in vacuum, S represents an area of a capacitor, and d represents a distance between electrodes. V1 can be represented by $$V1 = (C2/C1) \times V2 \qquad (3)$$

From the equation (3), it can be seen that if C2 is significantly larger than C1, a sufficiently high voltage V1 can be applied to the first capacitor via the second capacitor. For example, if the capacitance of the first and second capacitors satisfy the relationship shown in the following equation (4), $$C2 > 100 \times C1 \qquad (4)$$

it is possible to drive the liquid crystal layer 300 via the first electrode 50 in a manner almost identical to the case when the liquid crystal layer 300 is directly driven by the reflective electrode 44. Here, because the natural oxide film 46 between the reflective electrode 44 and the first electrode 50 can be formed with a very small thickness, it is possible to obtain a very large value for the capacitance of the second capacitor C2 even if the area is very small. Therefore, the second capacitor C2 can easily satisfy the conditions described above in equation (4). In particular, as shown in FIG. 10, in a reflective LCD, because the overlap between the reflective electrode 44 and the first electrode 50 (capacitor area) is relatively large, the capacitance of the second capacitor C2 is sufficiently large and can satisfy the above relationship of equation (4).

In addition, in order to satisfy the relationship of equation (4), for example, it is preferable to set the areas of the reflective electrode 44 and of the first electrode 50 so that the area S1 of the first capacitor, that is, the area of the first electrode 50 formed in individual pattern for each pixel and the area S2 of the second capacitor, that is, the area of the overlap between the reflective electrode 44 and the first electrode 50 satisfy the following equation (5):

$$S2 > 0.1 \times S1 \tag{5}$$

The reflective LCD shown in FIG. 10 wherein the reflective electrode 44 has an area almost equal to the area of the first electrode 50 can reliably satisfy the relationship of equation (5).

The equations (4) and (5) are satisfied with a voltage loss of 1% or less in a configuration wherein, for example, the distance d1 (thickness of the liquid crystal layer 300) between the first electrode 50 and the second electrode 250 is 5 μm, the dielectric constant $\in_1$ of the liquid crystal layer (average dielectric constant of the liquid crystal layer) is 5, the distance d2 between the reflective electrode 44 and the first electrode 50 (thickness of the natural oxide film 46) is 50 nm, and the dielectric constant $\in_2$ between the reflective electrode 44 and the first electrode 50 (average dielectric constant of the natural oxide film, etc.) is 5. Even when some of these conditions are not satisfied, it is possible to sufficiently drive the first electrode 50 from the reflective electrode 44 via the capacitive coupling.

Figure 13:
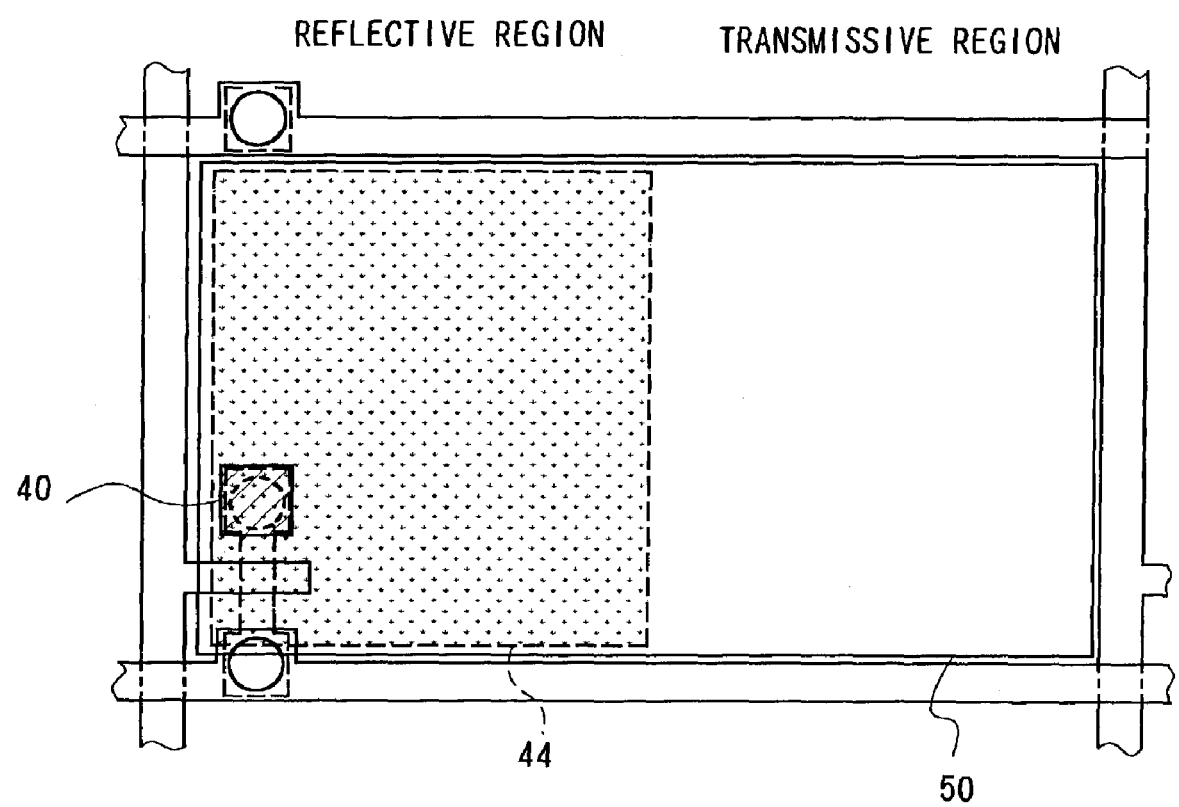
FIG. 13 is a diagram schematically showing a planar structure of a first substrate side of an active matrix transflective LCD according to the second preferred embodiment of the present invention.

FIG. 13 schematically shows a planar structure of an active matrix transflective LCD. The difference from the structure of FIG. 10 is that the reflective electrode 44 formed below the first electrode 50 is smaller than a pixel region and there is a region wherein the reflective electrode 44 is not formed. Because the area of formation of the reflective electrode 44 within a pixel region is small, the second capacitance is smaller than in the case of the reflective LCD. However, the distance d2 between the reflective electrode 44 and the transparent electrode 50 is 1/100 of the distance d1 of the liquid crystal layer in the structure exemplified above, and therefore, the capacitance value of the capacitor C2 can satisfy equation (4) described above.

The transflective LCDs must include both light transmitting functionality and light reflecting functionality, and in particular, with regard to the required light reflecting functionality, further improvement in brightness is desired. For this purpose, the reflective electrode 44 is designed with a size of at least 10% of the area of a pixel region, and this structure can satisfy the equation (5).

As described, even in transflective LCDs, it is possible to connect the reflective electrode 44 to the pixel TFT 110 through a connection structure (manufacturing method) identical to the case of reflective LCDs. In addition, by leaving the natural oxide film 46 between the reflective electrode 44 and the first electrode 50, it is possible to apply a voltage corresponding to the display content from the reflective electrode 44 to the first electrode 50 via a second capacitor (C2) formed between the reflective electrode 44 and the first electrode 50. Because the first electrode 50 made of a transparent conductive material is formed closer to the liquid crystal layer 300 than is the reflective electrode 44, it is possible to symmetrically drive the liquid crystal layer 300 by the first electrode 50 and the second electrode 250. Therefore, it is possible to inexpensively increase the degree of symmetry of the driving of the liquid crystal and improve the display quality. In addition, a second capacitor with sufficient capacitance for driving the first electrode 50 can be formed without specifically increasing the size of the reflective electrode, which allows for sufficient brightness when the transmissive functionality of the LCD is used.

In the structure exemplified above in the second embodiment, it is preferable that the thickness of the first electrode 50 is set similar to the first embodiment and in a range from 1 Å to 100 Å (more preferably 10 Å to 100 Å) or from 750 Å to 1250 Å in order to prevent coloring or the like and obtain superior optical characteristics. As described, according to the second embodiment, similar as in the first embodiment, because a first electrode and a second electrode made of transparent conductive materials having similar work functions are disposed on a side facing the liquid crystal layer 300 respectively of the first substrate side and of the second substrate side, it is possible to symmetrically drive the liquid crystal layer by the first and second electrodes. In addition, a reflective layer for reflecting light incident from the second substrate side is formed below the first electrode and is connected to the switching element.

Although the first electrode is electrically insulated from the reflective electrode by an insulating layer such as a natural oxide film formed between the first electrode and the reflective electrode, because of the capacitor (second capacitor) formed by the electrodes, a voltage approximately equal to the voltage corresponding to the display content can be applied from the reflective electrode to the first electrode. In addition to the advantage that reflective LCDs and transflective LCDs can be realized by the presence of the reflective layer, there is also an advantage that although a transparent first electrode is formed on the reflective electrode for realizing symmetrical driving of the liquid crystal, there is no need to alter the connection structure of the reflective electrode and the switching element from that in the reflective LCDs. Because of this, it is possible to obtain reflective liquid crystal display apparatuses and transflective liquid crystal display apparatuses having simple structure, high display quality, and low power consumption while reducing the manufacturing cost.

What is claimed is:

1. A liquid crystal display apparatus comprising a first substrate having a first electrode individually provided for each pixel, a second substrate having a second electrode, and a liquid crystal layer sealed between the first and second substrates, for achieving display in each pixel, wherein the first substrate further comprises a switching element provided for each pixel and a reflective electrode for reflecting light incident from the second substrate side to the liquid crystal layer, the reflective electrode partially covering a pixel region and fanned above and electrically connected to the switching element;

a transparent electrode made of a transparent conductive material is formed as the first electrode above the reflective electrode with an insulating film therebetween;

the transparent electrode is capacitively coupled to the reflective electrode; and a voltage supplied from the switching element to the reflective electrode is applied to the transparent electrode via a capacitor formed of the reflective electrode and the first electrode disposed with the insulating film therebetween.

2. A liquid crystal display apparatus according to claim 1, wherein a difference between a work function of the transparent conductive material of the first electrode and a work function of a transparent conductive material of the second electrode formed on a side, facing the liquid crystal layer, of the second substrate is 0.5 eV or less.

3. A liquid crystal display apparatus according to claim 2, wherein the drive frequency of the liquid crystal layer in each pixel is lower than 60 Hz.

4. A liquid crystal display apparatus comprising a first substrate having a first electrode individually provided for each pixel, a second substrate having a second electrode, and a liquid crystal layer sealed between the first and second substrates, for achieving display in each pixel, wherein the first substrate further comprises a switching element provided for each pixel and a reflective electrode for reflecting light incident from the second substrate side to the liquid crystal layer, the reflective electrode formed above and electrically connected to the switching element;

a transparent electrode made of a transparent conductive material is formed as the first electrode above the reflective electrode with an insulating film therebetween;

the transparent electrode is capacitively coupled to the reflective electrode;

a voltage supplied from the switching element to the reflective electrode is applied to the transparent electrode via a capacitor formed of the reflective electrode and the first electrode disposed with the insulating film therebetween; and a capacitance C1 of a pixel capacitor formed of the first electrode and the second electrode disposed to oppose each other with the liquid crystal layer therebetween and a capacitance C2 of the capacitor formed of the reflective electrode and the first electrode satisfy a condition, $C2 > 100 \times C1$.

5. A liquid crystal display apparatus according to claim 4, wherein
a difference between a work function of the transparent conductive material of the first electrode and a work function of a transparent conductive material of the second electrode formed on a side, facing the liquid crystal layer, of the second substrate is 0.5 eV or less.

6. A liquid crystal display apparatus according to claim 5, wherein the drive frequency of the liquid crystal layer in each pixel is lower than 60 Hz.

7. A liquid crystal display apparatus according to claim 4, wherein the thickness of the transparent electrode is in a range from 750 Å to 1250 Å.

8. A liquid crystal display apparatus according to claim 4, wherein the thickness of the transparent electrode is in a range from 1 Å to 100 Å.

9. A liquid crystal display apparatus comprising a first substrate having a first electrode individually provided for each pixel, a second substrate having a second electrode, and a liquid crystal layer sealed between the first and second substrates, for achieving display in each pixel, wherein
the first substrate further comprises a switching element provided for each pixel and a reflective electrode for reflecting light incident from the second substrate side to the liquid crystal layer, the reflective electrode formed above and electrically connected to the switching element;

a transparent electrode made of a transparent conductive material is formed as the first electrode above the reflective electrode with an insulating film therebetween;

the transparent electrode is capacitively coupled to the reflective electrode;

a voltage supplied from the switching element to the reflective electrode is applied to the transparent electrode via a capacitor formed of the reflective electrode and the first electrode disposed with the insulating film therebetween; and an area S1 of the first electrode disposed to oppose the second electrode with the liquid crystal layer therebetween and an area S2 of the overlapping portion of the reflective electrode and the first electrode disposed to oppose each other with the insulating film therebetween satisfy a relationship, $S2 > 0.1 \times S1$.

10. A liquid crystal display apparatus according to claim 9, wherein
a difference between a work function of the transparent conductive material of the first electrode and a work function of a transparent conductive material of the second electrode formed on a side, facing the liquid crystal layer, of the second substrate is 0.5 eV or less.

11. A liquid crystal display apparatus according to claim 9, wherein the drive frequency of the liquid crystal layer in each pixel is lower than 60 Hz.

12. A liquid crystal display apparatus according to claim 9, wherein the thickness of the transparent electrode is in a range between 750 Å and 1250 Å.

13. A liquid crystal display apparatus according to claim 9, wherein the thickness of the transparent electrode is in a range between 1 Å and 100 Å.

14. A liquid crystal display apparatus comprising a first substrate having a first electrode, a second substrate having a second electrode, and a liquid crystal layer sealed between the first and second substrates, wherein
a reflective layer for reflecting light incident from the second substrate side to the liquid crystal layer is formed as a first electrode above the first substrate;

a transparent electrode made of a transparent conductive material is formed covering the reflective layer, the thickness of the transparent electrode being in a range from 1 Å to 100 Å;

a switching element corresponding to each pixel is provided between the reflective layer and the first substrate;

the switching element is connected to the reflective layer consisting the first electrode;

an insulating film is formed between the reflective layer and the transparent electrode;

the transparent electrode is capacitively coupled to the reflective layer via the insulating film; and a voltage supplied from the switching element to the reflective layer is applied to the transparent electrode via a capacitor formed of the reflective layer and the transparent electrode disposed with the insulating film therebetween.

15. A liquid crystal display apparatus comprising a first substrate having a first electrode, a second substrate having a second electrode, and a liquid crystal layer sealed between the first and second substrates, wherein
a reflective layer for reflecting light incident from the second substrate side to the liquid crystal layer is provided above the first substrate, the first electrode is a transparent electrode made of a transparent conductive metal oxide material and formed to cover the reflective layer, the thickness of the transparent electrode being in a range from 1 Å to 100 Å;

the second electrode is a transparent electrode made of a transparent conductive metal oxide material.

16. A liquid crystal display apparatus according to claim 15, wherein
the thickness of the transparent electrode on the first substrate is 10 Å or greater.

17. A liquid crystal display apparatus according to claim 15, wherein a switching element corresponding to each pixel is provided between the reflective layer and the first substrate, and
the switching element is electrically connected to the first electrode.

18. A liquid crystal display apparatus according to claim 15, wherein a difference between a work function of the transparent conductive material of the first electrode and a work function of a transparent conductive material of the second electrode formed on a side, facing the liquid crystal layer, of the second substrate is 0.5 eV or less.

19. A liquid crystal display apparatus according to claim 15, wherein
 a switching element corresponding to each pixel is provided between the reflective layer and the first substrate;
 the switching element is electrically connected to the transparent electrode;
 an insulating film is formed between the transparent electrode and the reflective layer;
 the transparent electrode is capacitively coupled to the reflective layer via the insulating film; and
 a voltage supplied from the switching element to the reflective layer is applied to the transparent electrode via a capacitor formed by the reflective layer and the transparent electrode disposed with the insulating film therebetween.

20. A liquid crystal display apparatus according to claim 15, wherein
 a natural oxide film of the reflective layer is formed on a surface of the reflective layer covered by the first electrode.

21. A liquid crystal display apparatus comprising a first substrate having a first electrode, a second substrate having a second electrode, and a liquid crystal layer sealed between the first and second substrates, wherein a reflective layer for reflecting light incident from the second substrate side to the liquid crystal layer is formed as a first electrode above the first substrate;
 a transparent electrode made of a transparent conductive metal oxide material is formed covering the reflective layer, the thickness of the transparent electrode being in a range from 1 Å to 100 Å; and
 the second electrode is a transparent electrode made of a transparent conductive metal oxide material.

22. A liquid crystal display apparatus according to claim 21, wherein
 the thickness of the transparent electrode on the first substrate is 10 Å or greater.

23. A liquid crystal display apparatus according to claim 21, wherein
 a switching element corresponding to each pixel is provided between the reflective layer and the first substrate, and
 the switching element is electrically connected to the first electrode.

24. A liquid crystal display apparatus according to claim 21, wherein
 a difference between a work function of the transparent conductive material of the transparent electrode and a work function of a transparent conductive material of the second electrode formed on a side, facing the liquid crystal layer, of the second substrate is 0.5 eV or less.

* * * * *

UNITED STATES PATENT AND TRADEMARK OFFICE
CERTIFICATE OF CORRECTION

| | | |
|---|---|---|
| PATENT NO. | : 7,133,094 B2 | Page 1 of 1 |
| APPLICATION NO. | : 10/376721 | |
| DATED | : November 7, 2006 | |
| INVENTOR(S) | : Shinji Ogawa et al. | |

It is certified that error appears in the above-identified patent and that said Letters Patent is hereby corrected as shown below:

Column 8:
Line 33, after "shows", delete "across" and insert therefor --a cross--.

Column 20:
Line 40, before "above", delete "fanned" and insert therefor --formed--.

Signed and Sealed this

Twentieth Day of March, 2007

JON W. DUDAS
*Director of the United States Patent and Trademark Office*